(12) United States Patent
Jang et al.

(10) Patent No.: US 7,876,933 B2
(45) Date of Patent: Jan. 25, 2011

(54) METHODS AND APPARATUS FOR ESTIMATING ORIENTATION IN AN IMAGE

(75) Inventors: Won-churl Jang, Gyeonggi-do (KR); Dong-jae Lee, Seoul (KR); Deok-soo Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 937 days.

(21) Appl. No.: 11/508,459

(22) Filed: Aug. 23, 2006

(65) Prior Publication Data
US 2007/0047785 A1    Mar. 1, 2007

(30) Foreign Application Priority Data
Aug. 23, 2005    (KR)    ............ 10-2005-0077531

(51) Int. Cl.
*G06K 9/00*    (2006.01)
(52) U.S. Cl. ............... 382/124; 382/127; 382/125; 382/254
(58) Field of Classification Search .......... 382/100, 382/101, 103, 118, 181, 124, 195, 190, 141
See application file for complete search history.

(56) References Cited

U.S. PATENT DOCUMENTS

| | | | |
|---|---|---|---|
| 5,261,008 A | 11/1993 | Yamamoto | |
| 5,267,324 A * | 11/1993 | Kumagai | .............. 382/127 |
| 5,717,788 A | 2/1998 | Barnsley | |
| 6,263,091 B1 * | 7/2001 | Jain et al. | .............. 382/125 |
| 6,289,112 B1 | 9/2001 | Jain et al. | |
| 6,314,197 B1 | 11/2001 | Jain et al. | |
| 6,766,040 B1 * | 7/2004 | Catalano et al. | .............. 382/115 |
| 2003/0039382 A1 * | 2/2003 | Yau et al. | .............. 382/125 |

FOREIGN PATENT DOCUMENTS

| | | |
|---|---|---|
| DE | 100 27 657 A1 | 12/2001 |
| DE | 102 39 342 A1 | 3/2004 |
| DE | 102 60 642 A1 | 7/2004 |
| EP | 1 288 856 A1 | 3/2003 |
| JP | 2005-010842 | 1/2005 |
| KR | 1020030019788 A | 8/2001 |

OTHER PUBLICATIONS

Search Report for European Application No. 06 16736.5, mailed Dec. 27, 2006.

* cited by examiner

*Primary Examiner*—Samir A. Ahmed
*Assistant Examiner*—Ruiping Li
(74) *Attorney, Agent, or Firm*—Myers Bigel Sibley & Sajovec

(57) ABSTRACT

Methods and apparatus for estimating an orientation are disclosed. Methods of estimating an orientation include: dividing a fingerprint image into first partial regions, measuring the gradient of each pixel of the fingerprint image, and estimating a representative orientation of each of the first partial regions; obtaining an improved fingerprint image by filtering the fingerprint image using a double orientation filter, and remeasuring the representative orientation of each of the first partial regions by remeasuring the gradient of each pixel of the improved fingerprint image; and dividing the first partial regions into second partial regions, and estimating the representative orientation of the second partial regions with respect to the curvatures of the first partial regions in response to the remeasured representative orientation of each of the first partial regions and the remeasured gradients of the pixels.

46 Claims, 17 Drawing Sheets

FIG. 7A
FIG. 7B
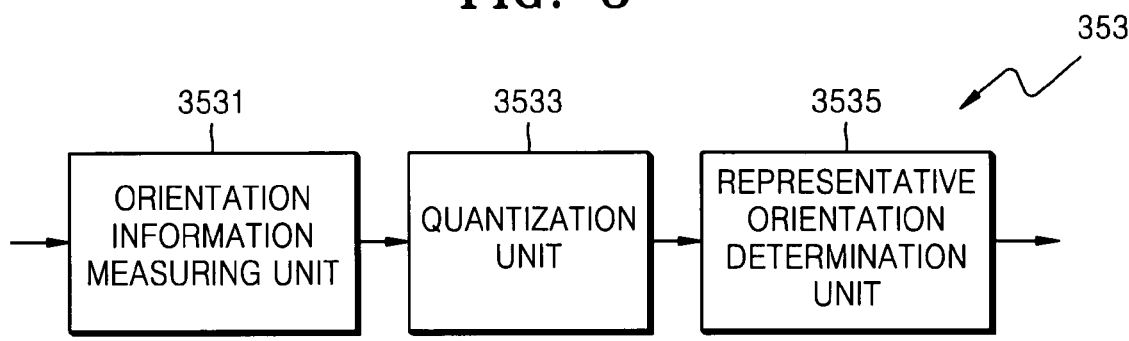
FIG. 8
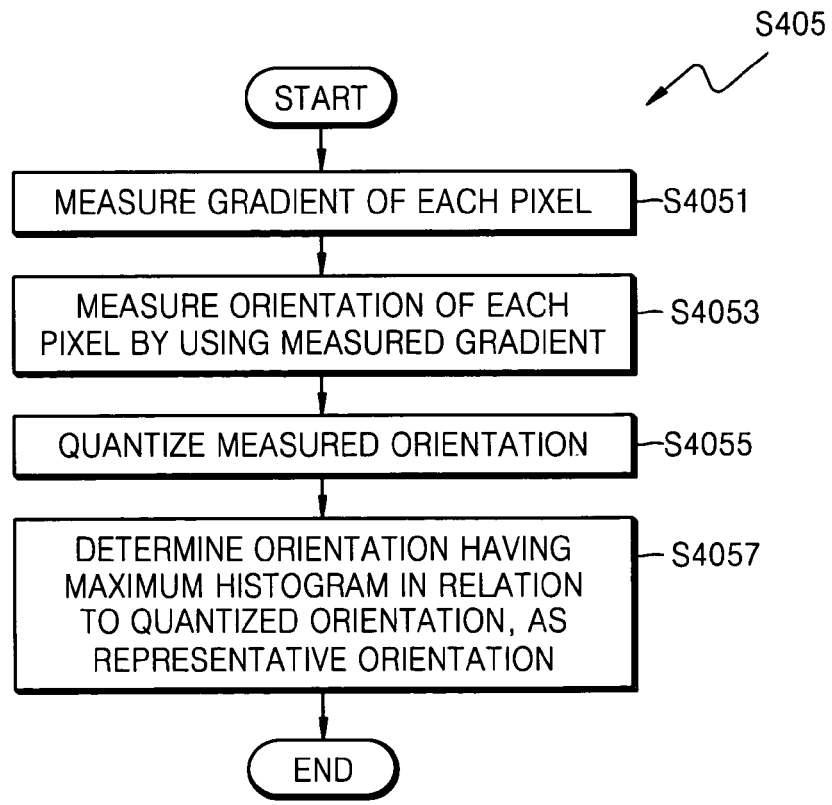
FIG. 9

(a) UNCLEAR ORIENTATION
(b) CLEAR ORIENTATION
(c) UNCLEAR ORIENTATION
(d) CLEAR ORIENTATION (b)

METHODS AND APPARATUS FOR ESTIMATING ORIENTATION IN AN IMAGE

CROSS-REFERENCE TO RELATED PATENT APPLICATIONS

This application claims priority under 35 USC§119 to Korean Patent Application No. 10-2005-0077531, filed on Aug. 23, 2005, in the Korean Intellectual Property Office, the disclosure of which is incorporated herein in its entirety by reference.

FIELD OF THE INVENTION

The present invention relates to methods and apparatus for estimating an orientation in an image having directivity, and more particularly, to methods and apparatus capable of accurately estimating the orientation of an image such as a fingerprint image.

BACKGROUND

The orientation field, or orientation, of an image may be used as important information for parsing the image. For example, in the field of image searching in which many images are searched for important images, and in the field of image tracking field, in which a predetermined object, such as a person or a car, is tracked from moving pictures, the orientation field of the image is used intensively. For this reason, technologies for accurately analyzing the orientation field of an image have been actively researched in a variety of fields.

In particular, since in the fingerprint recognition field, fingerprint recognition is performed by using the shape of ridges and valleys of a fingerprint, technology for accurately estimating the orientation field of a fingerprint, and the orientation of the ridges in particular, from a fingerprint image is important. Because of this importance, many research activities for technologies for measuring the orientation field of a fingerprint quickly and accurately have been conducted.

Among these technologies, representative ones include a technology for measuring the orientation field of a fingerprint using a neural net theory, a technology for measuring the orientation field of a fingerprint using an image filter, and a technology for measuring the orientation field using gradient information calculated from the brightness of pixels in a fingerprint image. In particular among them, the technology measuring the orientation field by using the gradient information is widely used.

A fingerprint recognition system is a system for identifying an individual by using characteristics of a fingerprint that are different in each individual, and by using the orientation field of a fingerprint in particular.

FIG. 1 is a block diagram of the structure of an ordinary fingerprint recognition system.

As shown in FIG. 1, the fingerprint recognition system includes a fingerprint image acquisition unit 110, a fingerprint region extraction unit 130, an orientation estimation unit 150, a fingerprint characteristic extraction unit 170, a fingerprint recognition unit 190, and a fingerprint characteristic storage unit 195.

The fingerprint image acquisition unit 110 obtains a fingerprint image and can include a fingerprint recognition sensor to obtain only a fingerprint image, and/or can also include a camera embedded in a digital camera or a mobile phone.

The fingerprint region extraction unit 130 extracts only a fingerprint region excluding a background in an obtained fingerprint image. The fingerprint orientation estimation unit 150 estimates the orientation field of a fingerprint using the structure of the ridges and valleys of the fingerprint in the extracted fingerprint region. In order to estimate the orientation field of the fingerprint, the orientation measuring technologies described above have been used.

The fingerprint characteristic extraction unit 170 extracts the fingerprint characteristics using the orientation field of the fingerprint. The extracted fingerprint characteristics are stored in the fingerprint characteristic storage unit for fingerprint recognition. When fingerprint recognition is performed, the fingerprint recognition unit 190 performs fingerprint recognition by comparing the fingerprint characteristics extracted in the fingerprint characteristic extraction unit 170 with the fingerprint characteristics stored in the fingerprint characteristic storage unit 195.

As described above, the fingerprint characteristics are extracted using the orientation field of the fingerprint and accordingly, accurate and fast estimation of the orientation field of the fingerprint is one of major subjects in the fingerprint recognition field.

In general, when a clear fingerprint image can be obtained as in a fingerprint sensor, the orientation of the fingerprint can be easily and accurately measured. However, when a clear fingerprint image cannot be obtained, for example, when a fingerprint image is obtained using an image taking apparatus, such as a digital camera and/or a mobile phone camera, the orientation of the fingerprint may not be measured accurately. In particular, when a fingerprint image is distorted by strong external light, camera noise or a variety of factors (for example, too soft skin as those of children and women, a moist finger, and a finger with a wound), an incorrect orientation of the fingerprint may be detected.

FIG. 2 illustrates dome forms of distortion that can occur when a fingerprint image is obtained using a camera.

Broadly speaking, five types of distortions can occur in a fingerprint image obtained using a camera under illuminations such as sunlight and/or camera flash.

The first distortion is caused by the curved circumferential shape of a finger. As shown in regions 1 and 1' of FIG. 2, the interval between a ridge and a valley of a fingerprint is uniform in a region (region 1) which is level in relation to the direction of a camera lens, while both sides of the finger are sloping in relation to the direction of the camera lens and the interval between ridges and valleys gradually narrows (region 1').

The second distortion occurs because of the protruded part of the center of the fingertip. As shown in region 2 of FIG. 2, the shape of the ridge is clear in the central part of the finger, but the side part of the finger has a shade such that the shape of the ridge becomes unclear.

The third distortion occurs due to wounds such as scars and/or burns on the finger skin. As shown in region 3 of FIG. 2, when a wound is on the finger skin, an artificial valley is formed and thus, when the orientation of the fingerprint is measured, a ridge orientation that is totally different from that of the actual ridge orientation can be measured.

The fourth distortion is also caused by the protruded part of the center of the fingertip. As shown in region 4 of FIG. 2, a blurring phenomenon occurs in which due to the protruded part of the fingertip, focusing becomes partially incorrect to make the image blurred.

The fifth distortion occurs by illumination existing when a fingerprint image is taken by a camera. That is, when a fingerprint image is taken by a camera, illumination such as camera flash light and/or sunlight can be applied to the finger. As shown in region 5 of FIG. 2, when the illumination is applied, a phenomenon in which a predetermined region of the fingerprint image is too bright can occur.

Besides, when the skin of the finger is too soft as in those of children and women, or when the finger is too moist, distortion can occur in the fingerprint image.

However, according to the conventional orientation measuring technologies, when a clear fingerprint image cannot be obtained, as when a fingerprint image is obtained using an image taking apparatus, such as a digital camera and/or a mobile phone camera, the orientation of the fingerprint may not be measured accurately, and in particular, when there is distortion in the fingerprint image, an incorrect orientation field of the fingerprint can be obtained.

SUMMARY

Some embodiments of the present invention provide methods for accurately estimating the orientation field of a fingerprint by repeatedly performing a process in which a fingerprint image is divided into partial regions and the representative orientation of the partial regions is measured, and according to the curvature of the partial regions, the partial regions are divided into smaller partial regions and the representative orientations of the smaller partial regions is measured.

The present invention also provides an apparatus for accurately estimating the orientation of a fingerprint by repeatedly performing a process in which a fingerprint image is divided into partial regions and the representative orientation of the partial regions is measured, and according to the curvature of the partial regions, the partial regions are divided into smaller partial regions and the representative orientation of the smaller partial regions is measured.

According to some embodiments of the present invention, there is provided a method of estimating an orientation including: dividing a fingerprint image into first partial regions, measuring the gradients of pixels of the fingerprint image, and estimating representative orientations of the first partial regions; obtaining an improved fingerprint image by filtering the fingerprint image using a double orientation filter, and remeasuring the representative orientation of each of the first partial regions by remeasuring the gradients of the pixels of the improved fingerprint image; and dividing each of the first partial regions into second partial regions, and estimating the representative orientations of the second partial regions with respect to the curvature of each of the first partial regions in response to the remeasured representative orientations of the first partial regions and the remeasured gradients of the pixels.

The methods may further include, after remeasuring the representative orientation, measuring the entire orientation of adjacent first partial regions and correcting an error of the remeasured representative orientations of the first partial regions in response to the difference of the entire orientation and the remeasured representative orientation of the first partial region.

The methods may further include, after estimating the representative orientations of the second partial regions, determining whether or not an error exists in the estimated representative orientations of the second partial regions; and if an error exists, dividing the second partial region into sub-partial regions of smaller sizes and then, according to whether or not an error exists, estimating the representative orientation of each sub-partial region.

The methods may further include dividing each of the sub-partial regions into sub-partial regions of smaller sizes until no error exists in the estimated representative orientations of the sub-partial regions, and then estimating the representative orientations of the divided sub-partial regions.

According to further embodiments of the present invention, there is provided an apparatus for estimating an orientation including a partial region division unit, an orientation estimation unit, and an orientation remeasuring unit.

The partial region division unit may be configured to divide a fingerprint image into first partial regions. The orientation estimation unit may be configured to measure the gradient of each pixel of the fingerprint image, to estimate a representative orientation of each of the first partial regions, to obtain an improved fingerprint image by filtering the fingerprint image by using a double orientation filter, and to remeasure the representative orientations of the first partial regions by remeasuring the gradients of the pixels of the improved fingerprint image. The orientation remeasuring unit may be configured to divide each of the first partial regions into second partial regions, and be configured to estimate the representative orientation of each of the second partial regions with respect to the curvature of each of the first partial regions in response to the remeasured representative orientations of the first partial regions and the remeasured gradients of the pixels.

The apparatus may further include a uniformization unit configured to adjust the uniformity of the fingerprint pattern, by processing the brightness characteristic of each first partial region, using the brightness characteristic of the fingerprint image in order to make the brightness characteristic uniform.

The apparatus may further include a post-processing unit configured to measure the entire orientation of adjacent first partial regions and to correct an error of the remeasured representative orientation of each first partial region in response to the difference of the entire orientation and the remeasured representative orientation of the first partial region.

The representative orientation error estimation unit may be further configured to determine whether or not an error exists in the estimated representative orientation of the second partial regions, and if no error exists, the representative orientation error estimation unit may output the estimated representative orientation as the fingerprint information of the fingerprint image, and if an error exists, the partial region redivision unit may divide the second partial region into sub-partial regions of smaller sizes and then, according to whether or not an error exists, the representative orientation reestimation unit may be configured to estimate the representative orientation of each divided sub-partial region according to whether or not an error exists.

Until no error exists in the estimated representative orientations of the sub-partial regions, the representative orientation error measuring unit may further determine whether or not an error exists in the estimated representative orientations of the sub-partial regions, and if no error exists in the representative orientations of the sub-partial regions, the representation orientation error measuring unit may output the representative orientation of the sub-partial regions as the orientation information of the fingerprint image. If an error exists in the representative orientation of a sub-partial region, the partial region redivision unit may divide the sub-partial regions into sub-partial regions of smaller sizes, and the representative orientation reestimation unit may estimate the representative orientation of each of the divided sub-partial regions of smaller sizes.

BRIEF DESCRIPTION OF THE DRAWINGS

The above and other features and advantages of the present invention will become more apparent by describing in detail exemplary embodiments thereof with reference to the attached drawings in which:

FIG. 7 is an operator for measuring a gradient in y and x orientations according to some embodiments of the present invention;

FIG. 8 is a block diagram of a representative orientation estimation unit of FIG. 3 according to some embodiments of the present invention;

FIG. 9 is a flowchart of a method of estimating the representative orientation of each of first partial regions in a representative orientation estimation unit of FIG. 8 according to some embodiments of the present invention;

DETAILED DESCRIPTION OF EMBODIMENTS OF THE INVENTION

Figure 1:
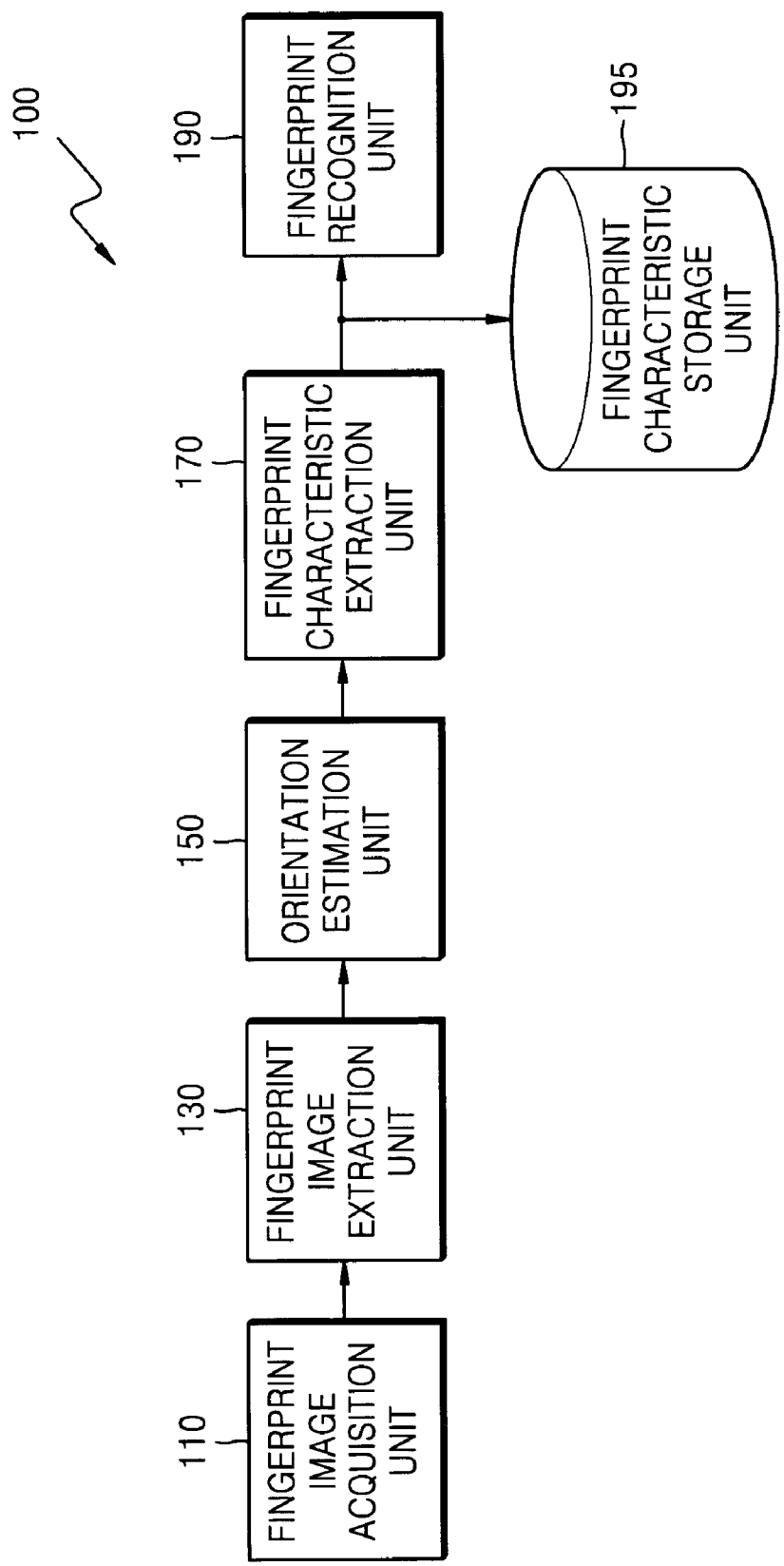
FIG. 1 is a block diagram of the structure of an ordinary fingerprint recognition system.
Figure 2:
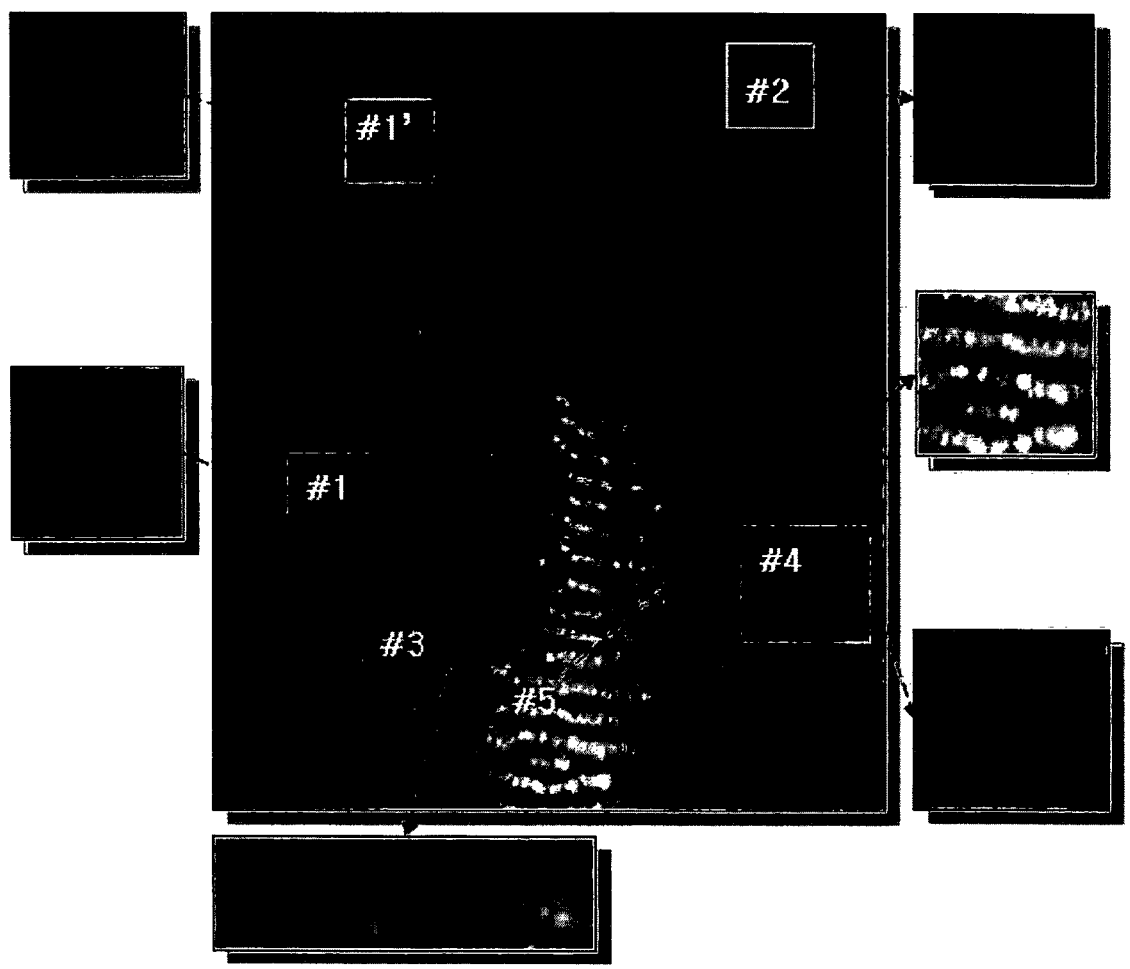
FIG. 2 illustrates distortion that can occur when a fingerprint image is obtained by using a camera.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Some embodiments of the invention provide methods and/or apparatus for accurately measuring the orientation field of a fingerprint in an unclear fingerprint image, and/or in a fingerprint image including distortion. A process of estimating the orientation according to some embodiments of the present invention will now be explained briefly.

First, a fingerprint is divided into first partial regions (with a size of N×N pixels; N may be a size four times larger than the thickness of a ridge in order to promote correct estimation of an orientation and in some embodiments of the present invention, N is equivalent to 32 pixels) and then, a representative orientation of each of the first partial regions is measured.

At this time, if there is a first partial region with an unclear structure of ridges and valleys, the quality of the fingerprint image may be improved by filtering the fingerprint image using a double orientation filter, and then, by remeasuring the representative orientation of the improved fingerprint image, estimation of more precise orientation is enabled.

Next, the first partial regions are divided into second partial regions (with a size of M×M pixels; for example, M=N/2). Then, using the representative orientations of the partial regions, the representative orientations of the second partial regions are measured.

After that, if there are regions having large curvatures among the second partial regions, the second partial regions are divided into sub-partial regions having a smaller size (for example, sub-partial regions may be obtained by dividing the previous partial regions to have a size one fourth of the previous size). Then, by sequentially measuring the representative orientations of the divided smaller sub-regions, the orientation field of the fingerprint can be quickly and accurately estimated.

Figure 3:
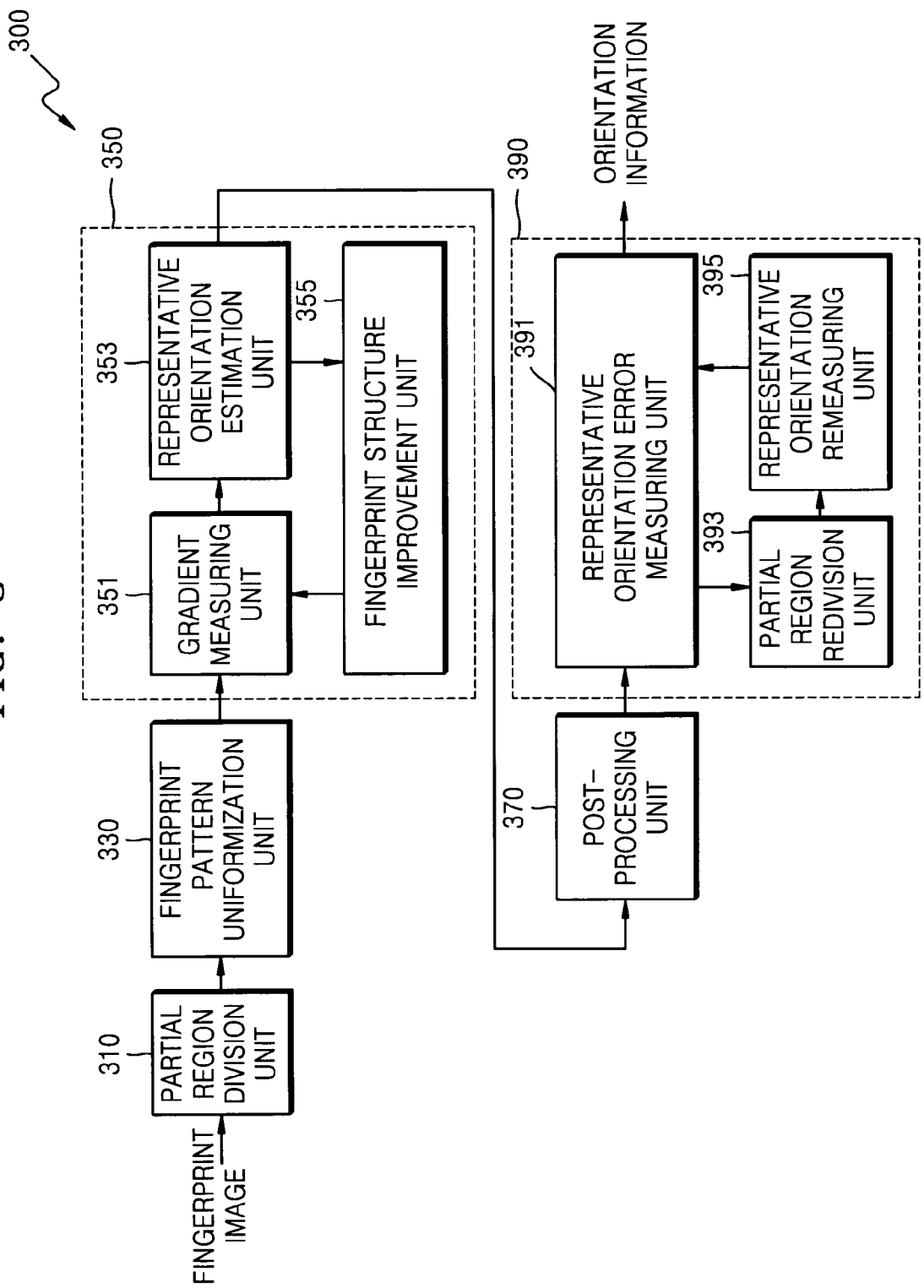
FIG. 3 is a block diagram of an apparatus for estimating an orientation according to some embodiments of the present invention.
Figure 4:
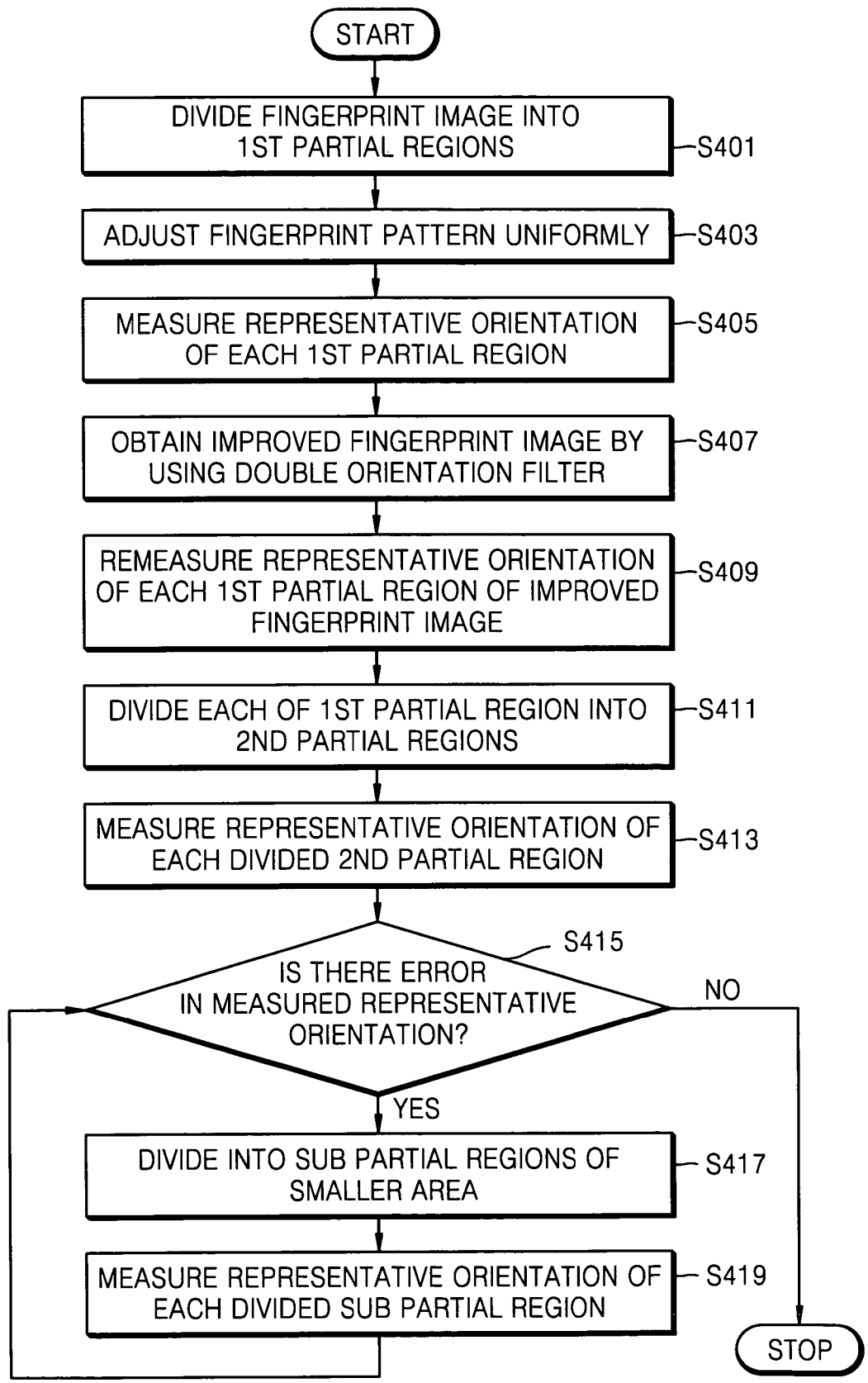
FIG. 4 is a flowchart of a method of estimating an orientation according to some embodiments of the present invention.

FIG. 3 is a block diagram of an apparatus for estimating an orientation field according to some embodiments of the present invention, and FIG. 4 is a flowchart illustrating methods of estimating an orientation according to some embodiments of the present invention. Referring to FIGS. 3 and 4, a process of outputting orientation information of a fingerprint image in an apparatus for estimating an orientation field according to some embodiments of the present invention will now be explained.

The apparatus for estimating an orientation field 300 includes a partial region division unit 310, an orientation estimation unit 350, and an orientation reestimation unit 390, and may further include a fingerprint pattern uniformization unit 330 and/or a post-processing unit 370.

The partial region division unit 310 divides a fingerprint image, which is obtained from a fingerprint image acquisition apparatus (not shown), such as a fingerprint recognition sensor, a camera, and/or a mobile phone camera, into first partial regions in operation S401. In some embodiments of the present invention, the first partial region has a size of N×N pixels, and N may be a size of 32 pixels, which may be four times larger than the thickness of a ridge.

The apparatus for estimating an orientation 300 may further include the fingerprint pattern uniformization unit 330. By using the brightness characteristics of the fingerprint image, the uniformization unit 330 processes the brightness characteristics of respective first partial regions so that the brightness can be made to be uniform and the fingerprint pattern can be adjusted to be uniform in operation S403.

The orientation estimation unit 350 measures the gradient of each of the pixels of the fingerprint image and first estimates the representative orientation of each of the first partial regions in operation S405, and according to the estimated representative orientations, improves the quality of the fingerprint image by filtering the image using a double orientation filter, so that an improved fingerprint image can be obtained in operation S407. Then, by remeasuring the gradient of each of the pixels of the improved fingerprint image, the orientation estimation unit 350 reestimates the representative orientation of each of the first partial regions in operation S409.

The apparatus for estimating an orientation may further include the post-processing unit 370. The post-processing unit 370 measures the entire orientation of the first partial regions adjacent to each of the first partial regions, and in response to the difference between the entire orientation and the remeasured representative orientation of each of the first partial regions, corrects the error of the remeasured representative orientation of each of the first partial regions.

The orientation reestimation unit 390 divides each of the first partial regions into second partial regions in operation S411, and in response to the representative orientation of each of the first partial region reestimated in the orientation estimation unit 350 and the remeasured gradient of each pixel, estimates the representative orientation of each of the second partial regions according to the curvature of each of the first partial regions in operation S413.

The orientation reestimation unit 390 then determines whether or not an error exists in the representative orientation of the second partial region in operation S415. If it is determined that no error exists, the orientation reestimation unit 390 outputs the estimated representative orientations of the second partial regions, as the orientation information of the fingerprint image.

If it is determined that there is an error, the orientation reestimation unit 390 divides the second partial regions into sub-partial regions of a smaller size in operation S417, and estimates the representative orientation of each of the sub-partial regions in operation S419.

In the same manner as in the estimation of the representative orientation of each of the partial regions, the orientation reestimation unit 390 measures the curvature of each of the sub-partial regions, determines whether or not an error exists in the representative orientations of the sub-partial regions in operation S415, and outputs the representative orientation of each of the sub-partial regions as the orientation information of the fingerprint image, or repeats the process of dividing each of the sub-partial regions into sub-partial regions of a smaller size in operation S417 and estimating the representative orientation, in operation S419.

As described above, in response to the curvature of the partial regions, it is determined in the orientation reestimation unit 390, whether or not an error exists in the estimated representative orientation of the partial regions, and if there is an error, by repeating the process of dividing the partial regions into sub-partial regions of a smaller size and estimating the representative orientation, some embodiments of the present invention can accurately estimate the orientation of the fingerprint even in a fingerprint image having considerable noise.

In some embodiments of the present invention, the second partial region has a size of M×M pixels and M may be a size of 16 pixels, which may be twice as large as the thickness of a ridge. Also, in some embodiments of the present invention, the sub-partial region can be obtained by dividing a partial region before division, into four regions of an identical size. For example, when each of second partial regions is divided into four sub-partial regions, the sub-partial region has a size of 8 pixels, or about the same as the thickness of a ridge.

Hereinafter, the detailed structures and operations of the fingerprint pattern uniformization unit 330, the orientation estimation unit 350, the post-processing unit 370, and the orientation reestimation unit 390 will be explained with reference to attached drawings.

Figure 5:
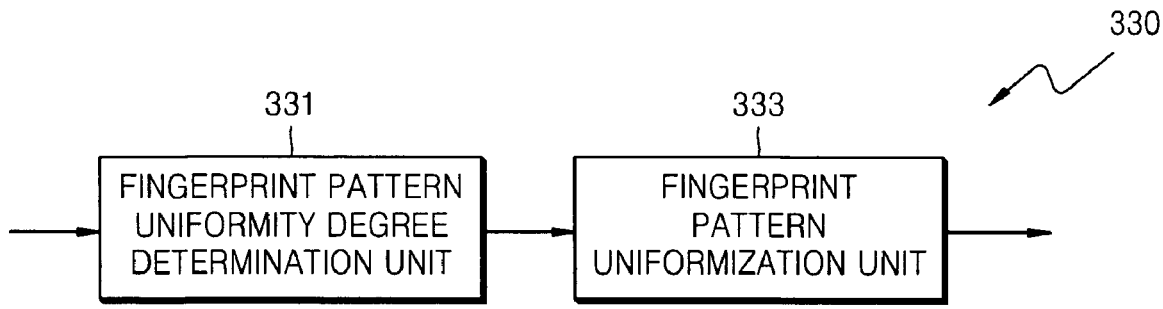
FIG. 5 is a block diagram of a fingerprint pattern uniformization unit of FIG. 5 according to some embodiments of the present invention.
Figure 6:
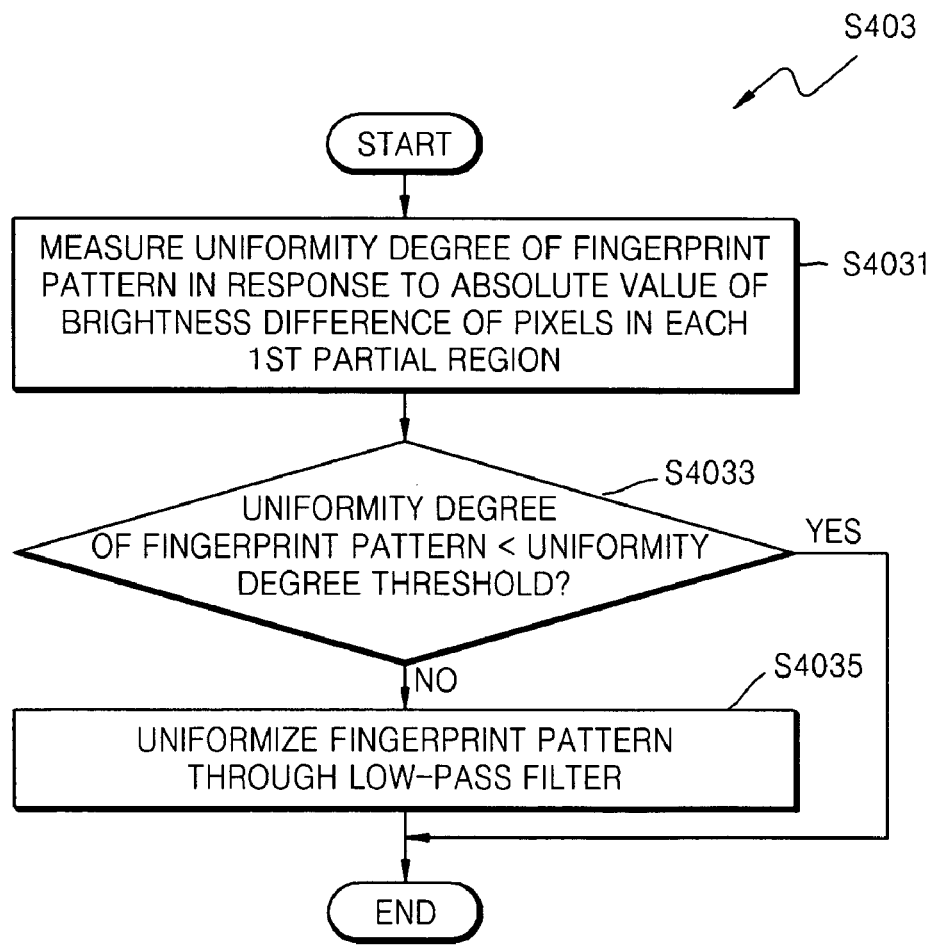
FIG. 6 is a flowchart of a method of adjusting a fingerprint pattern uniformly in a fingerprint pattern uniformization unit of FIG. 5 according to some embodiments of the present invention.

FIG. 5 is a block diagram of the fingerprint pattern uniformization unit 330 of FIG. 5 and FIG. 6 is a flowchart of a method of adjusting a fingerprint pattern uniformly in the fingerprint pattern uniformization unit 330 of FIG. 5 according to some embodiments of the present invention.

In case where a fingerprint image is obtained from an ordinary camera or a mobile phone camera that is not a fingerprint recognition sensor, it is highly probable that distortion may occur in the fingerprint image due to the negative effect of strong external lighting. When distortion due to the effect of the strong external illumination occurs, a part having the characteristic of a fingerprint valley can exist in a fingerprint ridge region. Also, conversely, a part having the characteristic of a fingerprint ridge can exist in a fingerprint valley region. Even when this type of distortion occurs, the uniformization unit 330 adjusts the fingerprint pattern so that the fingerprint pattern can become uniform.

The uniformization unit 330 includes a fingerprint pattern uniformity degree determination unit 331, and a fingerprint pattern uniformization unit 333. The fingerprint pattern uniformity degree determination unit 331 measures the uniformity degree of the fingerprint pattern in response to the absolute value of the brightness difference among pixels in each of the first partial regions in operation S4031. If the fingerprint pattern uniformity degree is less than a predetermined uniformity degree threshold, the fingerprint pattern uniformity degree determination unit 331 determines that the region has a uniform fingerprint pattern, or else determines that the fingerprint pattern of the region is not uniform.

In some embodiments of the present invention, the uniformity degree of a fingerprint pattern can be measured by using the following equation 1:

$$V_{noise}(m, n) = \sum_{i=0}^{N} \sum_{j=0}^{N} |x_{(mN+i,nN+j)} - x_{(mN+i-1,nN+j)}| \quad (1)$$

where Vnoise(m,n) denotes the fingerprint pattern uniformity degree of a first partial region at a location which is an m-th partial region in the x orientation and an n-th partial region in the y orientation, and x(x, y) denotes the brightness a pixel at coordinates (x, y). In some embodiments of the present invention, the uniformity degree threshold is determined experimentally with respect to the characteristics of an apparatus for obtaining a fingerprint image.

The fingerprint pattern uniformization unit 333 uniformizes the fingerprint pattern of the first partial region that is determined to have a non-uniform fingerprint pattern, for example by low-pass filtering the first partial region. In some embodiments of the present invention, the low-pass filtering can be performed by using a Gaussian filter.

Again referring to FIG. 3, the orientation estimation unit 350 includes a gradient measuring unit 351, a representative orientation estimation unit 353, and may further include a fingerprint structure improvement unit 355.

Taking a pixel whose gradient is being measured as a central pixel, the gradient measuring unit 351 performs convolution operations of predetermined neighboring pixels with gradient measuring operators of the first orientation and the second orientation that are perpendicular to each other, and by doing so, measures the gradients of the first orientation and the second orientation. In some embodiments of the present invention, the first orientation is the x orientation and the second orientation is the y orientation.

When the thickness of the ridge of a fingerprint image is considered, the image characteristic of an arbitrary pixel of the fingerprint image is more similar to the image characteristic of a second-adjacent pixel to the arbitrary pixel than the image characteristic of a pixel immediately adjacent to the arbitrary pixel. By reflecting this characteristic, in each of the gradient measuring operators for the x and y orientations, the absolute values of weights of the second-adjacent pixel to the central pixel in the x and y orientations are greater than the absolute values of weights of the pixel adjacent to the central pixel in the x and y orientations.

FIG. 7 is an operator for measuring a gradient in y and x orientations according to some embodiments of the present invention. FIG. 7(A) shows the gradient measuring operator in the y orientation and FIG. 7(B) shows the gradient measuring operator in the x orientation. As shown in FIG. 7, in some embodiments of the present invention, the y orientation operator has a size of 3×5 pixels, and the x orientation operator has a size of 5×3 pixels. As shown in FIG. 7, the absolute value of the weight of each of pixels adjacent to the central pixel in the x and y orientations is 1, and the absolute value of the weight of each of pixels second-adjacent to the central pixel in the x and y orientations is 2. Also, the weight of the central pixel and pixels adjacent to the central pixel in a direction transverse to the direction of the operator are 0 each.

The gradients of each pixel of the fingerprint image in the x and y orientations are measured by using the following equations 2-1 and 2-2:

$$xGradient(x, y) = \sum_{i=-2}^{2}\sum_{j=-1}^{1} p(x+i, y+j)O_x(i+2, j+1) \quad (2\text{-}1)$$

$$yGradient(x, y) = \sum_{i=-1}^{1}\sum_{j=-2}^{2} p(x+i, y+j)O_y(i+1, j+2) \quad (2\text{-}2)$$

where xGradient(x, y) and yGradient(x, y) denote the gradients of a pixel at coordinates (x, y) in the x orientation and in the y orientation, respectively, p(x, y) denotes the grayscale value of a pixel at coordinates (x, y), Ox(x, y) and Oy(x, y) denote gradient measuring operators in the x orientation and in the y orientation, respectively, with a pixel at coordinates (x, y) as a central pixel.

The structure and detailed operations of the representative orientation estimation unit 353 will now be explained with reference to FIGS. 8 and 9. FIG. 8 is a block diagram of the representative orientation estimation unit 353 of FIG. 3 and FIG. 9 is a flowchart of a method of estimating the representative orientation of each of first partial regions in the representative orientation estimation unit 353 of FIG. 8.

Referring to FIGS. 8 and 9, after the gradient measuring unit 351 measures the gradient of each of the pixels in operation S4051, the representative orientation estimation unit 353 measures the orientation of each pixel by using the gradient of the pixel in operation S4053. The measured orientation of each pixel is quantized in operation S4055, the histogram for each first partial region is obtained, and an orientation in which the histogram has a maximum value, is estimated as the representative orientation of the first partial region in operation S4057.

The representative orientation estimation unit 353 includes an orientation information measuring unit 3531, a quantization unit 3533, and a representative orientation determination unit 3535. The orientation information measuring unit 3531 measures the orientation of each pixel in response to the ratio of the gradient of the first orientation (that is, x orientation) and the gradient of the second orientation (that is, y orientation) in operation S4053. That is, the orientation of each pixel is measured by using the following equation 3:

$$O(x, y) = \frac{180}{\pi}\tan^{-1}\left(\frac{yGradient(x, y)}{xGradient(x, y)}\right) \quad (3)$$

where O(x,y) denotes the orientation of a pixel at coordinates (x, y), and xGradient(x, y) and yGradient(x, y) denote the gradients of a pixel at coordinates (x, y) in the x orientation and in the y orientation, respectively.

The quantization unit 3533 quantizes the orientation of each pixel in a predetermined angle unit in operation S4055. In some embodiments of the present invention, the orientation of each pixel is quantized in 180 degree/Z units and Z is 180. Accordingly, the orientation of each pixel is quantized in 1 degree units and in 180 steps.

The representative orientation determination unit 3535 obtains a histogram for the quantized value, and determines an orientation corresponding to a quantized value in which the histogram has a maximum value, as a representative orientation in operation S4057.

In some embodiments of the present invention, a histogram is expressed as the following equation 4:

$$H_{mn}(O(x, y)/Z) = \sum_{i=-M}^{M}\sum_{i=-M}^{M} K(O(mN+i, nN+j)/Z) \quad (4)$$

where Hmn denotes the histogram of a first partial region at a location which is an m-th partial region in the x orientation and an n-th partial region in the y orientation, and K(1)=1, and 1 is a value obtained by quantizing the orientation of each pixel. As shown in the equation 4, the histogram of each first partial region indicates the distribution of the numbers of identical quantization values.

That is, the location at which the histogram has a maximum value is a location where the number of identical quantization values has a maximum value. Therefore in each first partial region, the number of pixels having an orientation corresponding to the quantization value in which the histogram has a maximum value is the largest. Accordingly, the representative orientation determination unit 3535 determines the orientation corresponding to the quantization value of a location where the histogram has a maximum value, as the representative orientation.

Figure 10:
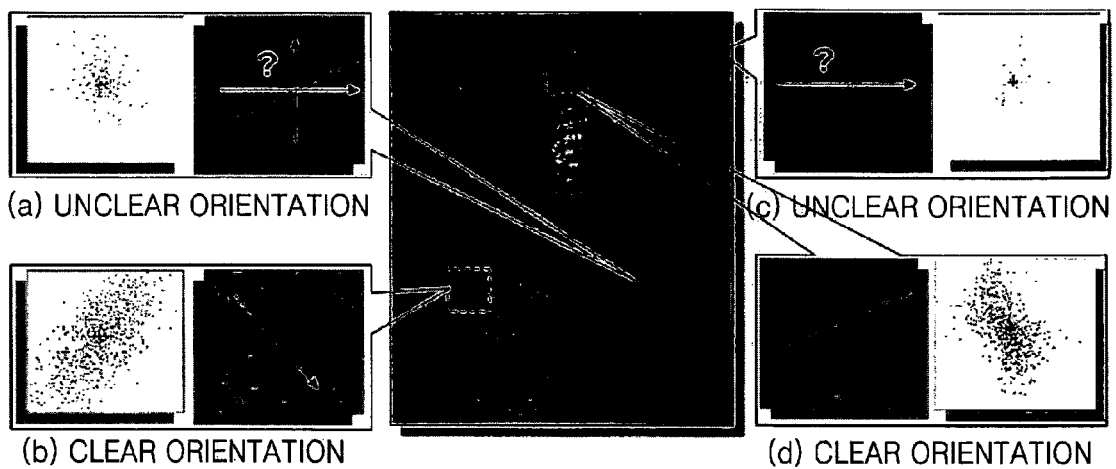
FIG. 10 illustrates examples of first partial regions of a fingerprint image in which an orientation is clear or unclear.

If there is a fingerprint region in the fingerprint image that includes a serious distortion, accurate orientation may be measured. FIG. 10 illustrates examples of first partial regions of a fingerprint image in which an orientation is clear or unclear. Assuming that the gradient in the x orientation is based on the x axis, and the gradient in the y orientation is based on the y axis, the distribution of points in FIG. 10 indicates the distribution of the gradient of each pixel in the first partial region and each arrow is a representative orientation of the first partial region obtained by using the distribution of the gradient.

As shown in FIG. 10, when there is no distortion in the fingerprint image, the fingerprint structure is clear and the representative orientation of the first partial region can be estimated clearly. But, if there is a distortion in the fingerprint image, the fingerprint structure is not clear and the representative orientation of the first partial region cannot be estimated clearly. Accordingly, when there is a serious distortion, it is needed to improve the structure of the ridge and valley of the fingerprint for a better fingerprint image and then, to estimate again the fingerprint orientation.

In order to improve the fingerprint structure, the orientation estimation unit 350 may further include a fingerprint structure improvement unit 355. The fingerprint structure improvement unit 355 determines whether or not the fingerprint image of each first partial region is clear, and by using a double orientation filter, improves the fingerprint image of each first partial region so that an improved fingerprint image can be obtained.

A method of obtaining an improved fingerprint image in the fingerprint structure improvement unit 355 will now be explained with reference to FIGS. 11 and 12.

Figure 11:
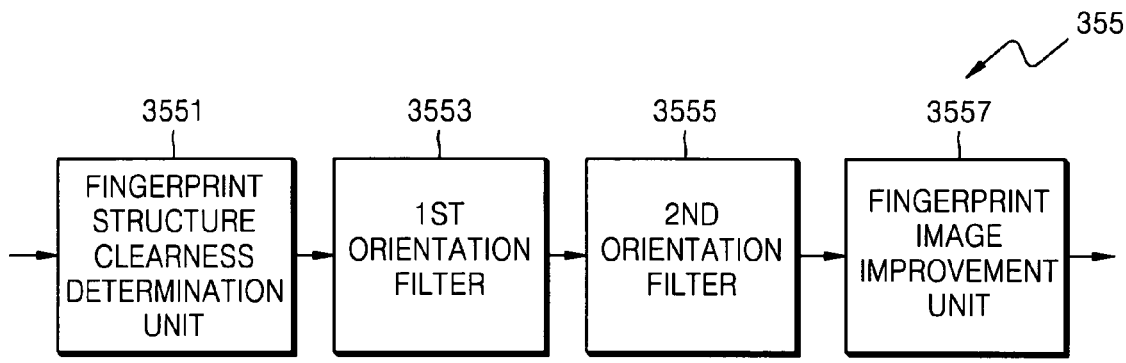
FIG. 11 is a block diagram of a fingerprint structure improvement unit of FIG. 3 according to some embodiments of the present invention.
Figure 12:
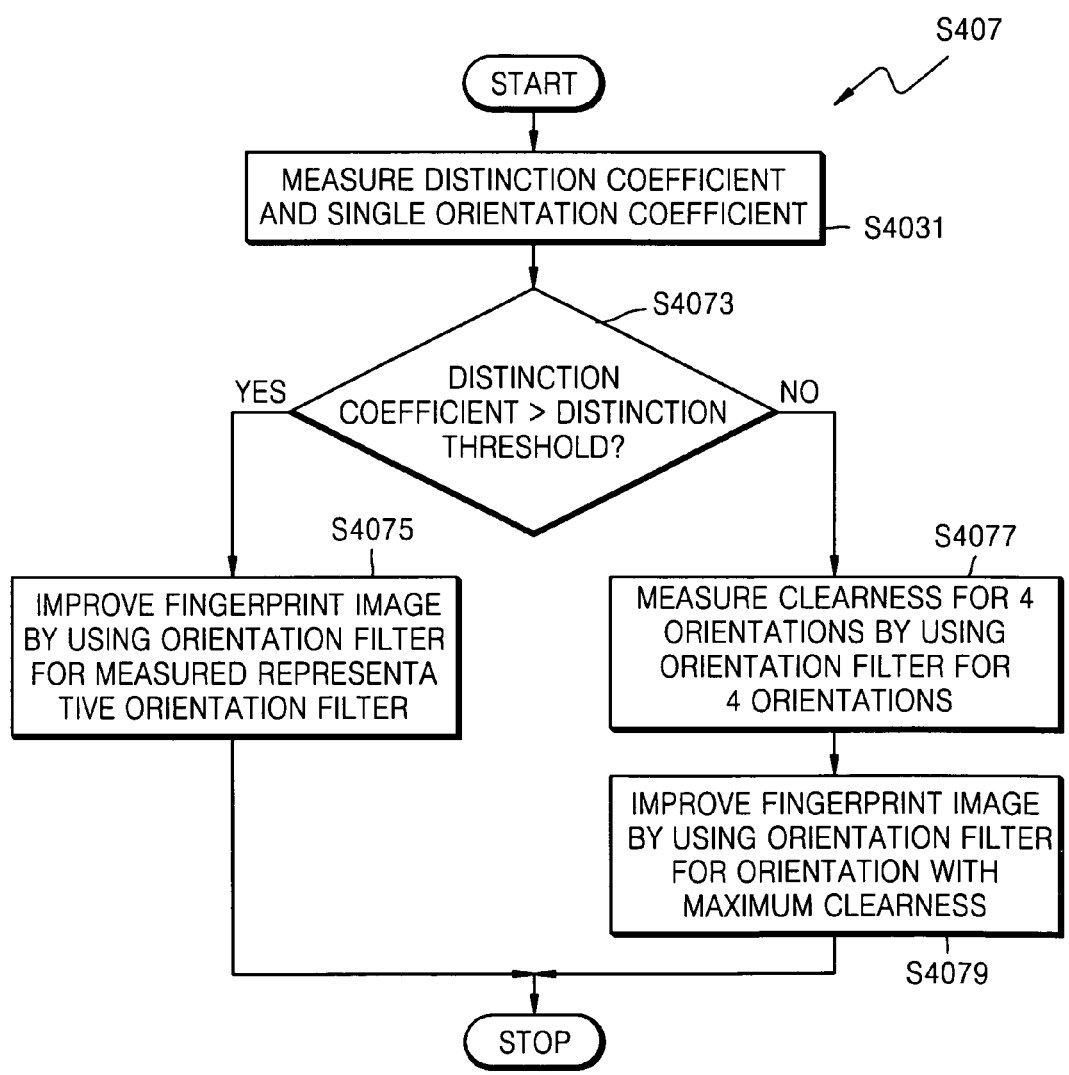
FIG. 12 is a flowchart of a method of obtaining a fingerprint image improved in a fingerprint structure improvement unit of FIG. 11 according to some embodiments of the present invention.

FIG. 11 is a block diagram of the fingerprint structure improvement unit 355 of FIG. 3 and FIG. 12 is a flowchart of a method of obtaining a fingerprint image improved in the fingerprint structure improvement unit 355.

The fingerprint structure improvement unit 355 includes a fingerprint clearness determination unit 3551, a first orientation filter 3553, a second orientation filter 3555, and a fingerprint image improvement unit 3557.

The fingerprint structure clearness determination unit 3551 measures the distinction coefficient and clearness coefficient in each first partial region in operation S4031, and by doing so, determines whether or not the fingerprint structure in the first partial region is clear. The distinction coefficient is a coefficient indicating a probability that a ridge and a valley exist, that is, the degree that the ridge and valley of a fingerprint image are clearly distinguished, and can be measured by using the following equation 5:

$$C_{h1} = \frac{\sum_{x=0}^{N}\sum_{y=0}^{N} xGradient[y][x] \cdot xGradient[y][x] + \sum_{x=0}^{N}\sum_{y=0}^{N} yGradient[y][x] \cdot yGradient[y][x]}{N \cdot N} \quad (5)$$

where Ch1 denotes a distinction coefficient.

A single orientation coefficient is a coefficient indicating the degree that the structure of the ridge and valley of a fingerprint image forms a single orientation, and can be measured by using the following equations 6, 7-1, and 7-2:

$$C_{h2} = \frac{\sum_{y=0}^{N}\sum_{x=0}^{N} \left\{ \begin{array}{c} xGradient[y][x] \cdot \cos\theta + \\ yGradient[y][x] \cdot \sin\theta - \overline{m_y} \end{array} \right\}^2}{\sum_{y=0}^{N}\sum_{x=0}^{N} \left\{ \begin{array}{c} yGradient[y][x] \cdot \cos\theta - \\ xGradient[y][x] \cdot \sin\theta - \overline{m_x} \end{array} \right\}^2} \quad (6)$$

$$\overline{m_y} = \frac{\sum_{x=0}^{N}\sum_{y=0}^{N} xGradient[y][x] \cdot \cos\theta + yGradient[y][x] \cdot \sin\theta}{N \cdot N} \quad (7\text{-}1)$$

$$\overline{m_i} = \frac{\sum_{x=0}^{N}\sum_{y=0}^{N} yGradient[y][x] \cdot \cos\theta - xGradient[y][x] \cdot \sin\theta}{N \cdot N} \quad (7\text{-}2)$$

where, Ch2 denotes is a single orientation coefficient, and θ denotes the estimated representative orientation of each first partial region.

Figure 13:
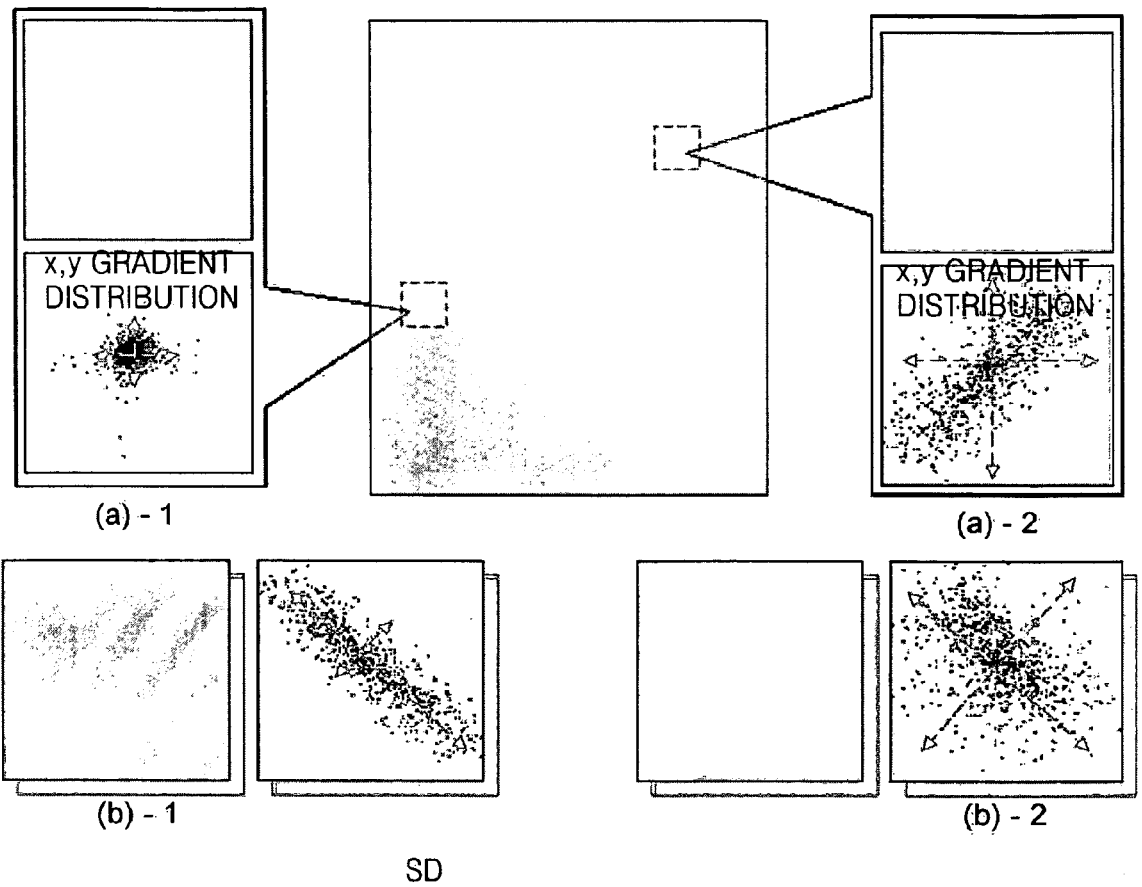
FIG. 13 illustrates distinction coefficients and singularity coefficients according to some embodiments of the present invention.

The distinction coefficient and the single orientation coefficient will now be explained with reference to FIG. 13. FIG. 13 illustrates distinction coefficients and singularity coefficients with FIGS. 13 (A)-1 and (A)-2 explaining the distinction coefficients and FIGS. 13 (B)-1 and (B)-2 explaining the single orientation coefficients.

As shown in FIG. 13 (A)-1, when the ridge and valley are not clearly distinguished, the distribution of the gradient shows concentration on the center. As shown in FIG. 13 (A)-2, when the ridge and valley are clearly distinguished, the gradient has a predetermined orientation and has a wider distribution. The distinction coefficient is a coefficient indicating this characteristic. When the ridge and valley are clearly distinguished and the gradient has a predetermined orientation with a wider distribution, the distinction has a larger value.

In order to accurately estimate the representative orientation of the first partial region, the gradient should have a distribution with a predetermined single orientation. As shown in FIG. 13 (B)-2, when the fingerprint ridge has a distribution without a predetermined single orientation, the gradient has a wide distribution in all orientations. The single orientation coefficient is a coefficient indicating this characteristic. When the fingerprint ridge has a predetermined single orientation and the gradient has a narrower distribution, the single orientation coefficient has a larger value.

Accordingly, the fingerprint structure clearness determination unit 3551 determines whether or not the distinction coefficient measured in each first partial region is greater than a predetermined distinction threshold, and the single orientation coefficient is greater than a predetermined single orientation threshold in operation S4073. If the distinction coefficient and the single orientation coefficient are greater, it is determined that the fingerprint structure of the first partial region is clear, or else it is determined that the fingerprint structure of the first partial region is not clear.

After determining whether or not the fingerprint structure of each first partial region is clear, the fingerprint structure is improved according to the determination result. In some embodiments of the present invention, after the orientation of the first partial region is first estimated, the fingerprint image is improved by using a double orientation filter according to the estimated orientation.

The double orientation filter includes a first orientation filter 3553 and a second orientation filter 3555. The double orientation filter will now be explained with reference to FIG. 14.

Figure 14A:
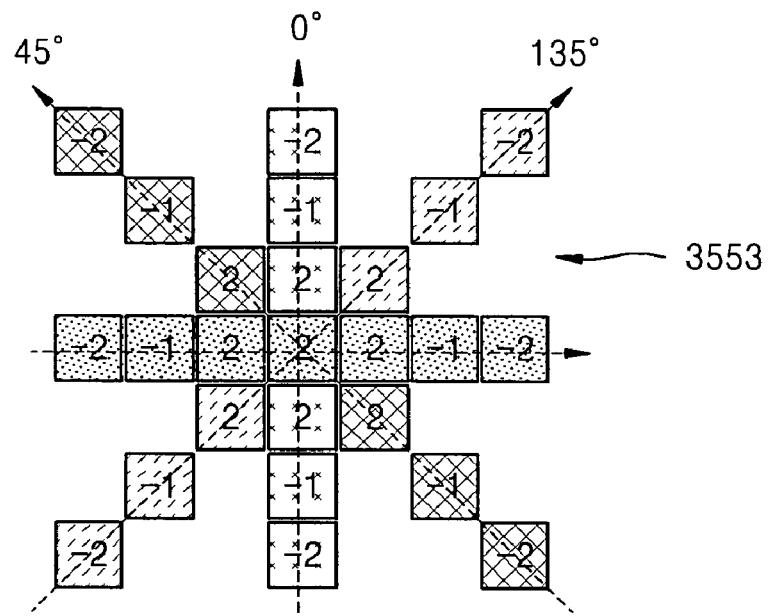
FIG. 14 illustrates a first orientation filter and a second orientation filter according to some embodiments of the present invention.
Figure 14B:
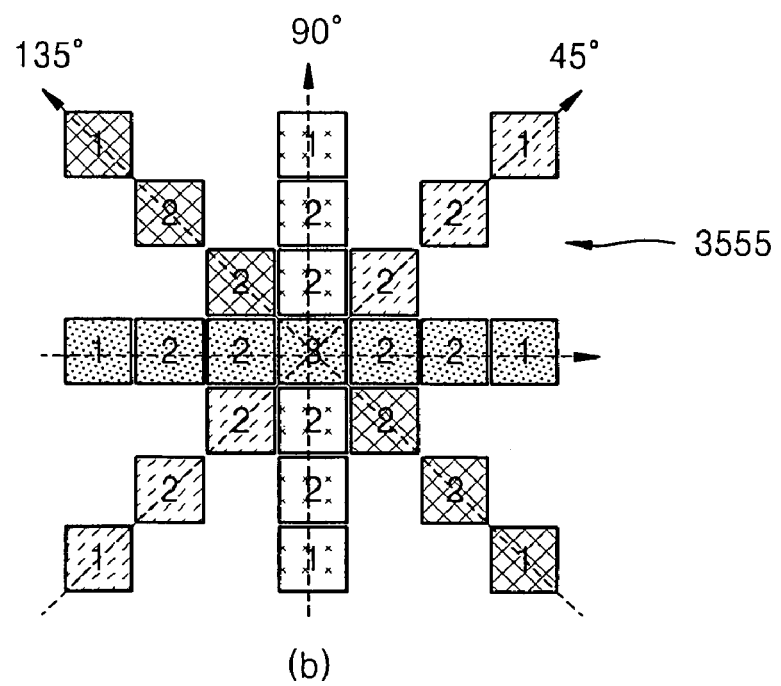

FIG. 14 illustrates a first orientation filter and a second orientation filter according to some embodiments of the present invention, with FIG. 14 (A) showing the first orientation filter and FIG. 14 (B) showing the second orientation filter.

As shown in FIG. 14, both the first orientation filter 3553 and the second orientation filter 3555 are one-dimensional filter for predetermined 4 orientations. In some embodiments of the present invention, the predetermined 4 orientations are 0, 45, 90, and 135 degrees.

The first orientation filter 3553 has a characteristic emphasizing the boundary of a ridge and a valley of an orientation corresponding to the orientation of a central pixel. The second orientation filter 3555 has a characteristic removing noise existing in a ridge and a valley of an orientation corresponding to the orientation of the central pixel.

As shown in FIG. 14 (A), in the first orientation filter 3553, a pixel in which the boundary of a ridge and a valley is desired to be emphasized is taken as a central pixel, and the weight in each of pixels immediately adjacent to the central pixel are the same as the weight of the central pixel. The weight in each second-adjacent pixel to the central pixel has a sign opposite to the weight of the central pixel and has a less absolute value than that of the weight of the central pixel. Also, the weight in each third-adjacent pixel to the central pixel has a sign opposite to the weight of the central pixel and has the same absolute value as that of the weight of the central pixel.

In the first orientation filter 3553 of some embodiments of the present invention, the weight of the central pixel and the weight of each of pixels immediately adjacent to the central pixel are 2, the weight in each of the second-adjacent pixels to the central pixel is −1, and the weight of each of the third-adjacent pixels to the central pixel is −2.

As shown in FIG. 14 (B), in the second orientation filter 3555, a pixel in which noise in the ridge and valley is desired to be removed is taken as a central pixel, and the weight in the central pixel has a maximum. The weight in each pixel immediately adjacent to the central pixel and the weight in each second-adjacent pixel to the central pixel are less than the weight in the central pixel. The weight in each third-adjacent pixel to the central pixel is less than the weight in each of the second-adjacent pixels to the central.

In the second orientation filter 3555 of some embodiments of the present invention, the weight in the central pixel is 3, the weight in each of pixels immediately adjacent to the central pixel and the weight in each second-adjacent pixel to the central pixel are 2 each, and the weight in each third-adjacent pixel to the central pixel is 1.

Figure 15A:
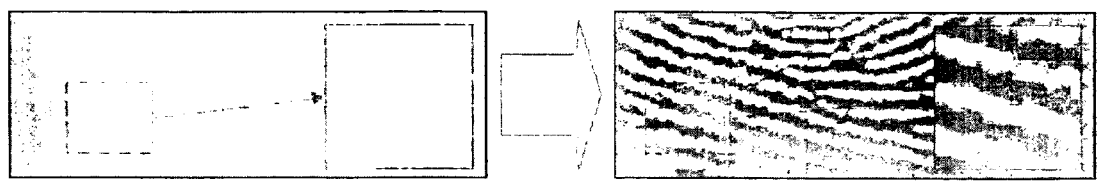
FIG. 15 illustrates examples of improved fingerprint images obtained by using a first orientation filter and a second orientation filter according to some embodiments of the present invention.
Figure 15B:
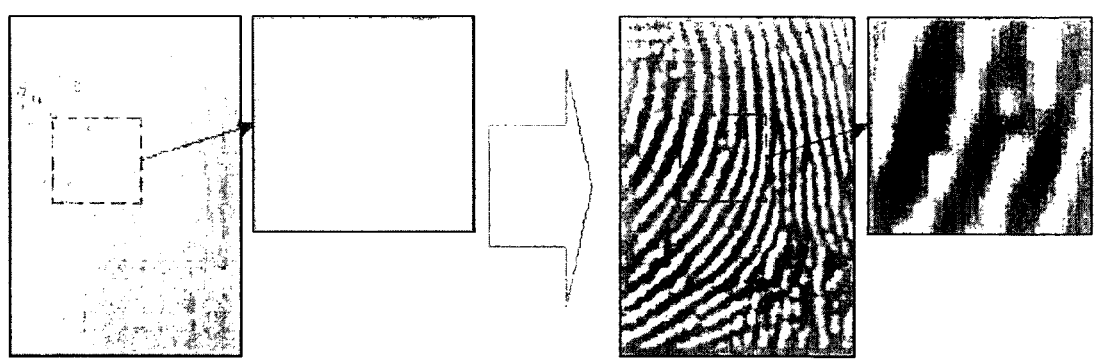

FIG. 15 illustrates examples of improved fingerprint images obtained by using the first orientation filter 3553 and the second orientation filter 3555.

FIG. 15 (A) shows a fingerprint image in which the boundary of a ridge and a valley is strengthened by using the first orientation filter 3553, and it can be seen that after filtering is performed with the first orientation filter 3553, the boundary of the ridge and valley becomes clearer.

FIG. 15 (B) shows a fingerprint image in which noise in the ridge is removed by using the second orientation filter 3555, and it can be seen that after filtering is performed with the second orientation filter 3555, noise in the ridge is removed such that the uniformity of the ridge structure is improved.

The fingerprint image improvement unit 3557 improves a fingerprint image by applying a double orientation filter, and a double orientation filter with an orientation appropriate to a fingerprint image should be applied. The fingerprint image improvement unit 3557 improves the fingerprint image of each first partial region by a different method according to whether or not the fingerprint structure of each first partial region is clear.

First, with the first partial regions that are determined to have clear fingerprint structures, the fingerprint image improvement unit 3557 performs filtering of each of the first partial region by using the first orientation filter and the second orientation filter of the representative orientation of each of the first partial region in operation S4075.

In relation to the first partial regions that are determined to have unclear fingerprint structures, the fingerprint image improvement unit 3557 performs filtering of each first partial region by using the first orientation filter and the second orientation filter of each of four orientations, and measures clearness of each of the four orientations of the filtered fingerprint image of each first partial region in operation S4079.

The clearness of each of the four orientations of each first partial region is measured in response to the power of each orientation after the filtering using the first orientation filter is performed and the single orientation coefficient of each orientation after the filtering using the second orientation filter is performed. The clearness in some embodiments of the present invention is measured by using the following equations 8 through 10:

$$C_{reactivity} = \alpha \cdot C_{RS_i} + \beta \cdot C_{RNR_i} \quad (8)$$

$$C_{RS_i} = 100 \cdot \frac{\sum_{x=0}^{N}\sum_{y=0}^{N}\{Inimage[y][x] \otimes RSF_i\}}{MaxPower_0} \quad (9)$$

$$C_{RNR_i} = \frac{N\sum_{y=0}^{M}\sum_{x=0}^{N}\left\{\begin{array}{c}xGradient[y][x]\cdot\cos\theta + \\ yGradient[y][x]\cdot\sin\theta - \overline{m_y}\end{array}\right\}^2}{\sum_{y=0}^{N}\sum_{x=0}^{N}\left\{\begin{array}{c}yGradient[y][x]\cdot\cos\theta - \\ xGradient[y][x]\cdot\sin\theta - \overline{m_x}\end{array}\right\}^2} \quad (10)$$

where Creactivity i denotes the clearness degree in i-th orientation in each first partial region, CRSi denotes the power in i-th orientation in each first partial region after the filtering using the first orientation filter is performed, CRNRi denotes the single orientation coefficient in i-th orientation of each first partial region after the filtering using the second orientation filter is performed, and α and β denote predetermined constants corresponding to conditions under which the fingerprint image is taken. In some embodiments of the present invention, α and β are determined by the characteristic of a fingerprint acquisition apparatus, and external conditions when the fingerprint is obtained. In some embodiments of the present invention, the clearness degree becomes higher as the fingerprint structure of a fingerprint image becomes clearer.

The fingerprint image improvement unit 3557 selects an image corresponding to an orientation in which the clearness becomes a maximum, among image passing through the first and second orientation filters, and by doing so, can improve the fingerprint image of the first partial regions that are determined to be unclear in operation S4079.

Figure 16:
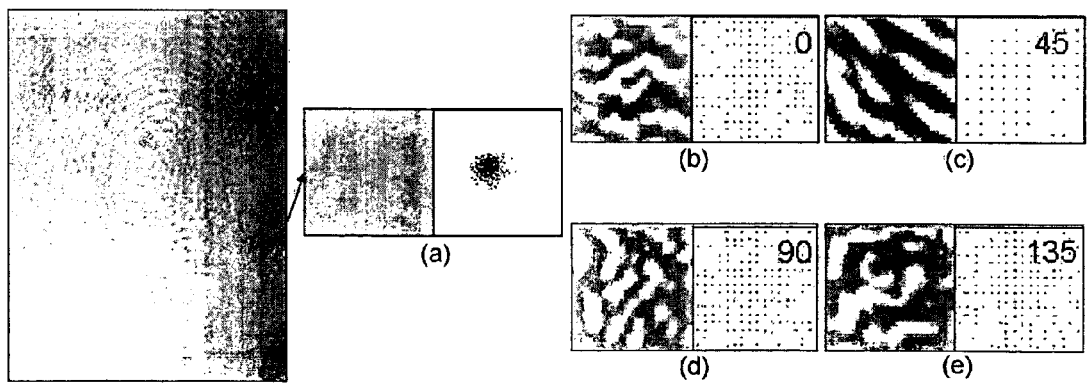
FIG. 16 illustrates a process of improving the fingerprint structure of a first partial region in which the orientation is unclear, according to some embodiments of the present invention.

FIG. 16 illustrates a process of improving the fingerprint structure of a first partial region in which the orientation is unclear.

FIG. 16 (A) shows the fingerprint image of the first partial region that is determined to be unclear and the gradient distribution. FIG. 16 (B) through (E) show fingerprint images filtered by applying double orientation filters of 0, 45, 90, and 135 degrees, respectively, to the fingerprint image of FIG. 16 (A).

As shown in FIG. 16, the fingerprint image filtered by applying the double orientation filter of 45 degrees has the clearest fingerprint image. Accordingly, the fingerprint image improvement unit 3557 selects the fingerprint image of FIG. 16 (C) and replaces the fingerprint image (A) so that the fingerprint image can be improved.

After the fingerprint image of each first partial region is improved, the gradient measuring unit 351 remeasures the gradient of each pixel of the improved fingerprint image, the representative orientation estimation unit 353 reestimates the representative orientation of each first partial region by using the remeasured gradient. The method of remeasuring the gradient and reestimating the representative orientation is performed in the same manner as the first measuring of the representative orientation, and therefore the detailed explanation will be omitted.

Even though the fingerprint image is improved and the representative orientation of each first partial region is estimated, if the fingerprint image is distorted too much, it is still possible that the orientation cannot be estimated accurately.

Accordingly, in some embodiments of the present invention, a method of correcting an error of the orientation of each first partial region in response to the orientations of adjacent first partial regions is used.

The orientation estimation apparatus 300 according to some embodiments of the present invention may further include the post-processing unit 370 to correct the error of an orientation. The post-processing unit 370 measures the entire orientation of the adjacent first partial regions, and in response to the difference of the entire orientation and the remeasured representative orientation of each first partial region, corrects the error of the representative orientation of each first partial region. The operation of correcting the error of the orientation will now be explained with reference to FIGS. 17 through 19.

Figure 17:
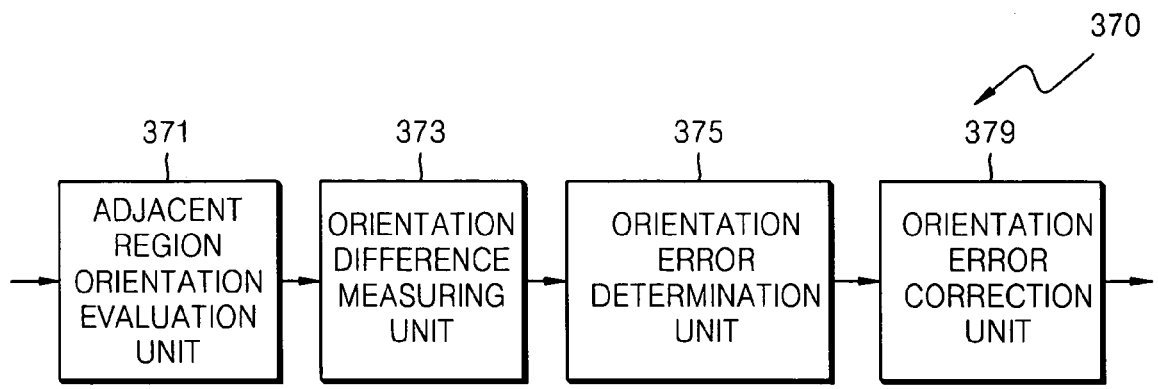
FIG. 17 is a block diagram of a post-processing unit of FIG. 3 according to some embodiments of the present invention.
Figure 18:
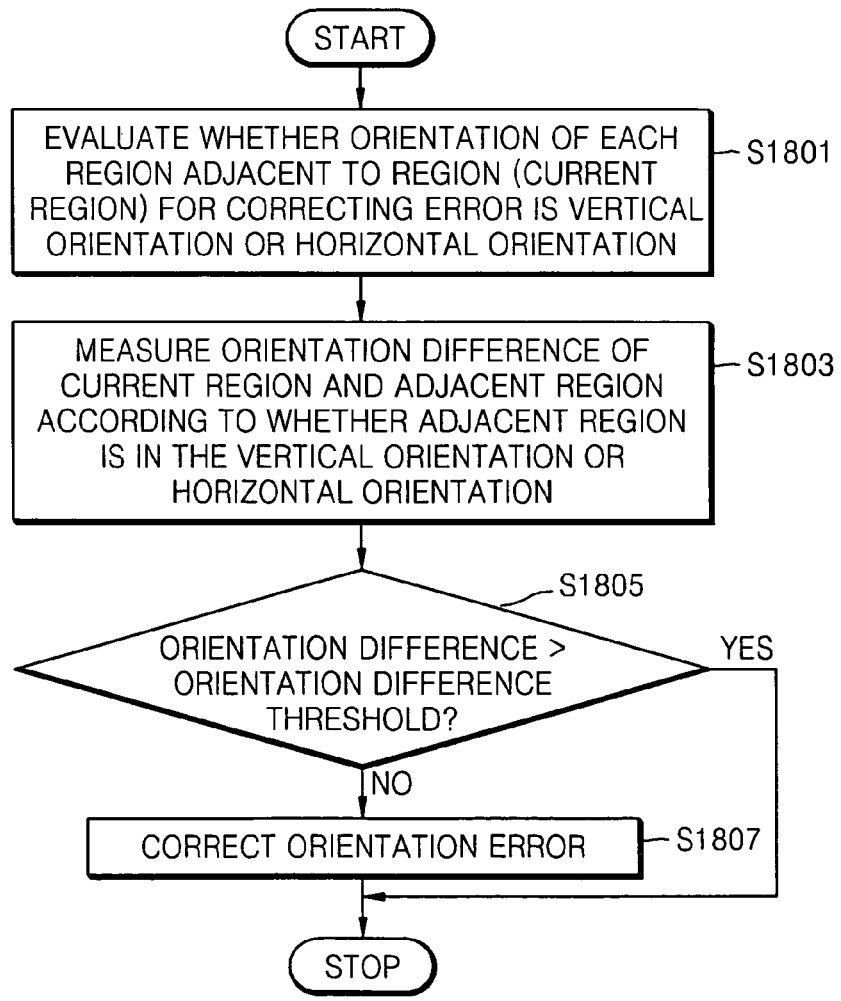
FIG. 18 is a flowchart of a method of correcting an orientation error in a post-processing unit of FIG. 17 according to some embodiments of the present invention.
Figure 19:
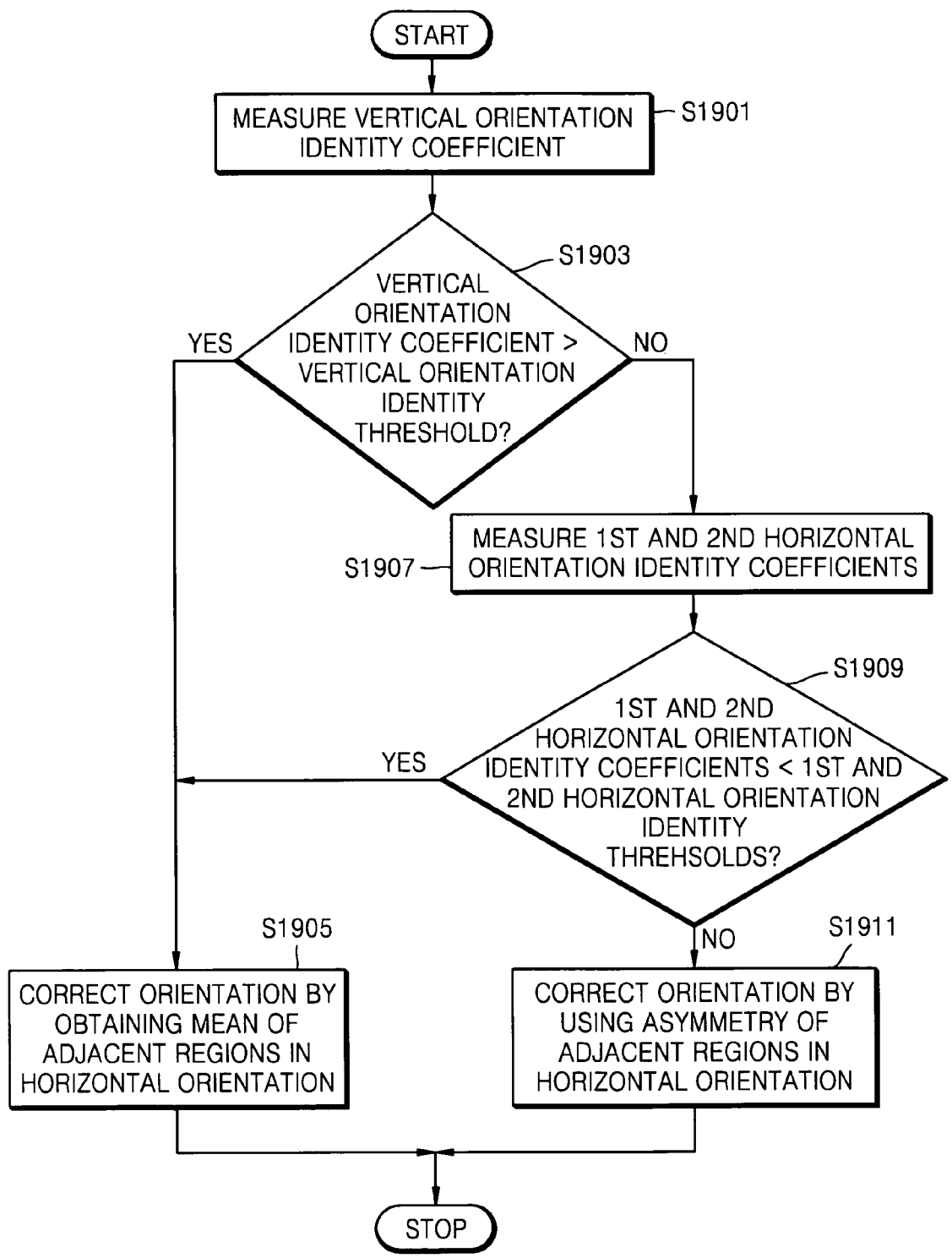
FIG. 19 is a flowchart showing a detailed process of correcting an orientation error according to some embodiments of the present invention.

FIG. 17 is a block diagram of the post-processing unit 370 of FIG. 3,

FIG. 18 is a flowchart of a method of correcting an orientation error in the post-processing unit 370 of FIG. 17, and FIG. 19 is a flowchart showing a detailed process of correcting an orientation error according to some embodiments of the present invention.

The post-processing unit 370 includes an adjacent region orientation evaluation unit 371, an orientation difference measuring unit 373, an orientation error determination unit 375, and an orientation error correction unit 379.

In relation to each first partial region (will be referred to as a "current region"), the adjacent region orientation evaluation unit 371 measures the difference of the remeasured representative orientations of the neighboring first partial regions adjacent to the current partial region and predetermined angles, and in response to the mean value of the differences, evaluates the entire orientation of the adjacent first partial regions in operation S1801.

In some embodiments of the present invention, the predetermined angle is 90 degrees, and the adjacent region orientation evaluation unit 371 measures the mean value of the differences (|θi−90 degrees|) of the four first partial regions adjacent to the current region (the four first partial regions adjacent to the current region in the vertical and horizontal directions). At this time, if the mean value is greater than 45 degrees, the adjacent region orientation evaluation unit 371 evaluates the entire orientation of the adjacent fingerprint regions as vertical, and if the mean value is less than 45 degrees, evaluates the entire orientation of the adjacent fingerprint regions as horizontal.

In relation to each first partial region, the orientation difference measuring unit 373 measures the orientation difference of the entire orientation and the representative orientation of each first partial region. The orientation difference measuring unit 373 measures the orientation difference by a different method according to whether the entire orientation is vertical or horizontal in operation S1803.

In some embodiments of the present invention, if the entire orientation is vertical, the difference is measured by using the following equation 11, and, if the entire orientation is horizontal, the difference is measured by using the following equation 12:

$$\Delta\theta'_{90} = \frac{1}{6}\sum_{i=1}^{4} w_i ||\theta_i - \theta_0| - 90| \qquad (11)$$

$$\Delta\theta'_0 = \frac{1}{6}\sum_{i=1}^{4} v_i ||\theta_i - \theta_0| - 90| \qquad (12)$$

where $\Delta\theta'_{90}$ denotes the orientation difference when the entire orientation is vertical, $\Delta\theta'_0$ denotes the orientation difference when the entire orientation is horizontal, $\Delta\theta$ denotes the orientation of a current region, $w_i$ and $v_i$ are weights that have $\{1, 1, 2, 2\}$ and $\{2, 2, 1, 1,\}$, respectively, when i=1, 2, 3, and 4, and when i=1, 2, 3, and 4, θi denotes the representative orientation of an adjacent first partial region to the left, to the right, below and above the current region, respectively.

The orientation error determination unit 375 compares the orientation difference measured in relation to each first partial region, with a predetermined orientation difference threshold in order to determine whether or not an error occurs in the representation orientation of each first partial region in operation S1805. In some embodiments of the present invention, the orientation error determination unit 375 determines that an error occurs in the representative orientation, if the orientation difference is equal to or less than the orientation difference threshold.

The orientation error correction unit 377 corrects the orientation error for the first partial regions in which errors occur in operation S1807. In some embodiments of the present invention, the orientation error correction unit 377 first measures a vertical orientation identity coefficient of the first partial regions adjacent vertically, by using the following equation 13:

$$\Delta Ori_{\theta[x][y]} = (\theta_{[x][y-1]} - 90) \times (\theta_{[x][y+1]} - 90) \qquad (13)$$

where $\Delta Ori\theta[x][y]$ denotes a vertical orientation identity coefficient in the current region, $\theta[x][y-1]$ denotes the representative orientation of the first partial region adjacent to and below the current region, $\theta[x][y+1]$ denotes the representative orientation of the first partial region adjacent to and above the current region.

If the vertical orientation identity coefficient is greater than a predetermined vertical orientation identity threshold, the orientation error correction unit 377 determines that the current region and the immediately adjacent first partial regions in the horizontal direction are in the same orientation, and corrects the orientation error of the current region in response to the mean value of the representative orientations of the first partial regions immediately adjacent to the current region in the horizontal direction, by using the following equation 14 in operation S1905:

$$\theta_{[y][x]} = \frac{1}{2}\{\theta_{[y][x-1]} + \theta_{[y][x+1]}\} \qquad (14)$$

where $\theta[x][y]$ denotes the representative orientation of the first partial region in which the orientation error is corrected.

If the vertical orientation identity coefficient is less than the predetermined vertical orientation identity threshold, the orientation error correction unit 377 determines that the current region and the immediately adjacent first partial regions in the horizontal direction have opposite orientations, and then measures a first horizontal orientation identity coefficient and a second horizontal orientation identity coefficient by using the following equations 15 and 16 in operation S1907:

$$\Delta\theta_{[y][x-1]} = |\theta_{[y][x-1]} - 90| \qquad (15)$$

$$\Delta\theta_{[y][x+1]} = |\theta_{[y][x+1]} - 90| \qquad (16)$$

where $\Delta\theta[y][x-1]$ denotes the first horizontal orientation identity coefficient, and $\Delta\theta[y][x+1]$ denotes the second horizontal orientation identity coefficient.

If the first and second horizontal orientation identity coefficients are less than predetermined first and second horizontal orientation identity thresholds, respectively, the orientation error correction unit 377 determines that the orientations of the current region and the immediately adjacent first partial regions in the horizontal direction are horizontal, and in response to the mean value of the representative orientations of the adjacent first partial regions in the horizontal direction, corrects the orientation error of the current region in operation S1905.

If the first and second horizontal orientation identity coefficients are not less than predetermined first and second horizontal orientation identity thresholds, respectively, the orientation error correction unit 377 determines that the orientations of the current region and the immediately adjacent first partial regions in the horizontal direction are vertical, and by using asymmetry of the adjacent first partial regions in the horizontal direction, corrects the error. In some embodiments of the present invention, the error correction using asymmetry is performed according to the following equation 17:

$$\theta_{[y][x]} = \mathrm{mod}_{180}\{\theta_{[y][x-1]} + \theta_{[y][x+1]}\} \quad (17)$$

where mod180{n} denotes an operator calculating the remainder of dividing n by 180.

Even though the representative orientation of each first partial region is estimated, if there is a region of a large curvature, such as a core point and a delta point, in the fingerprint image of the first partial region, two or more orientations may exist in the first partial region.

Figure 20:
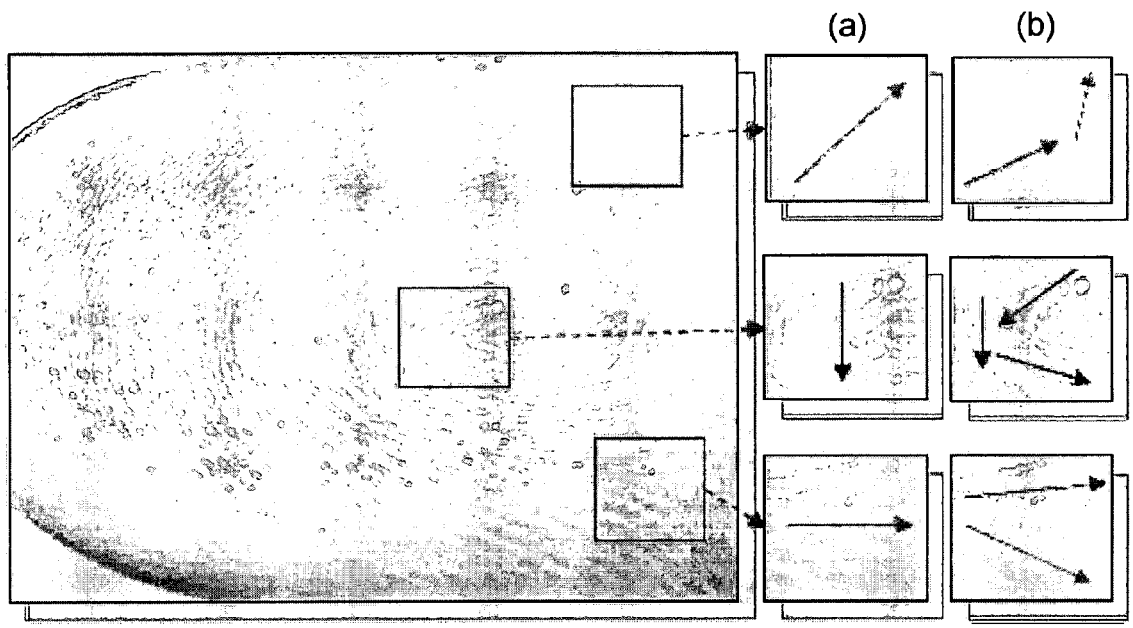
FIG. 20 illustrates an example of estimating an incorrect orientation according to a curvature.

FIG. 20 illustrates an example of estimating an incorrect orientation according to a curvature. FIG. 20 (B) shows an orientation that actually exists in the first partial region, and FIG. 20 (A) shows a representative orientation incorrectly estimated and different from the actual orientation in the first partial region in which the curvature is high. Accordingly, in a region of a large curvature, it is needed to divide each first partial region into smaller second partial regions and to estimate the representative orientation.

The orientation reestimation unit 390 divides each first partial region into second partial regions in operation S411, and according to the curvature of each first partial region, estimates the representative orientation of each second partial region in response to the representative orientation of each first region reestimated in the orientation estimation unit 350 and the remeasured gradient of each pixel in operation S413.

Referring again to FIG. 3, the orientation reestimation unit 390 includes a partial region redivision unit 393, a representative orientation error measuring unit 391, and a representative orientation reestimation unit 395.

Figure 21:
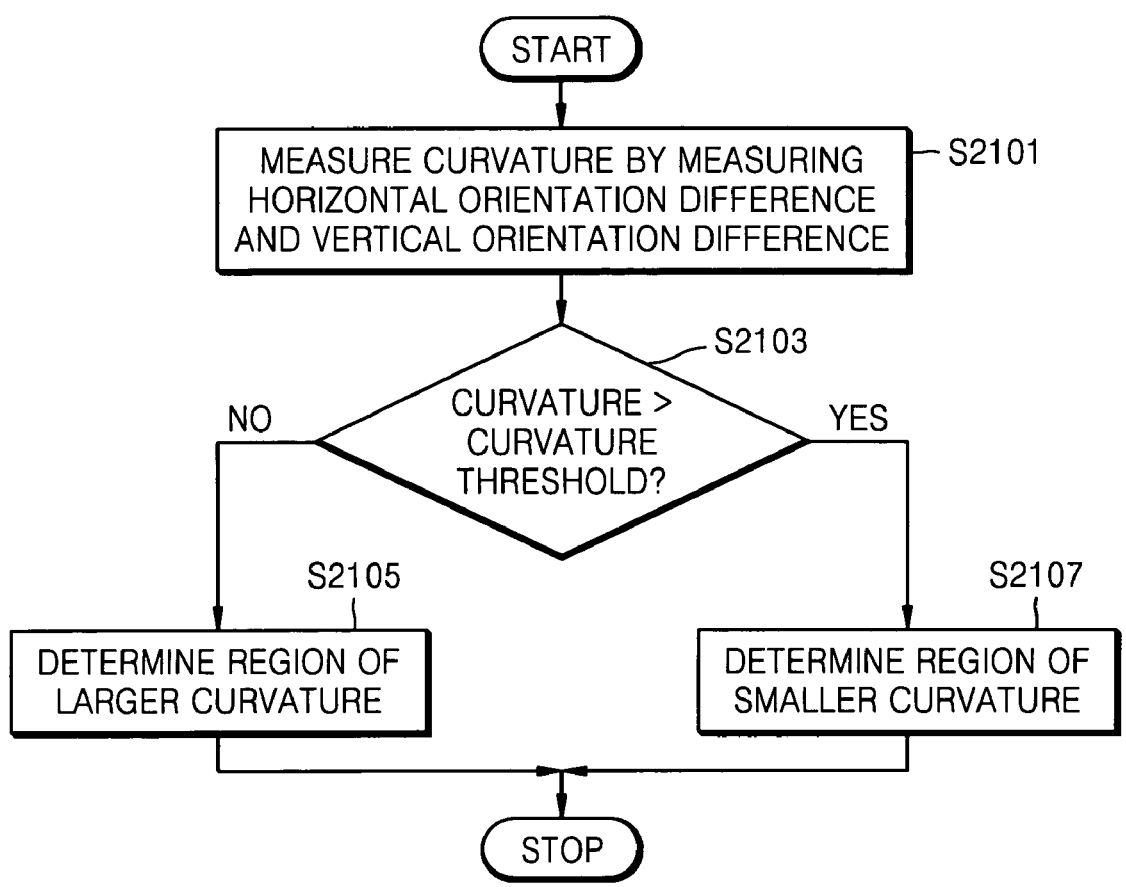
FIG. 21 is a flowchart of a method of determining a region of a larger curvature or a smaller curvature according to some embodiments of the present invention.

The partial region redivision unit 393 divides each first partial region into second partial regions. The method of determining a region of a high curvature or a low curvature in the representative orientation error measuring unit 391 will now be explained with reference to FIG. 21.

In relation to each first partial region (will be referred to as a "current region") the representative orientation error measuring unit 391 measures the curvature by using the vertical orientation difference with the representative orientations of the adjacent first partial regions in the vertical direction and the horizontal orientation difference with the representative orientations of the adjacent first partial regions in the horizontal direction in operation S2101.

In some embodiments of the present invention, the vertical orientation difference and the horizontal orientation difference are measured by using the following equations 18 and 19, respectively, and the curvature is measured by using the following equation 20:

$$\Delta v_\theta = ||\theta_{[y-1][x]} - \theta_{[y+1][x]}| - 90| \quad (18)$$

$$\Delta h_\theta = ||\theta_{[y][x-1]} - \theta_{[y][x+1]}| - 90| \quad (19)$$

$$\Delta C v_\theta = \alpha \Delta v_\theta \beta \Delta h_\theta \quad (20)$$

where $\Delta v\theta$ and $\Delta h\theta$ denote the vertical orientation difference and the horizontal orientation difference, respectively, $\Delta Cv\theta$ denotes the curvature, and $\alpha$ and $\beta$ denote proportionality constants determined according to the characteristics of a fingerprint acquisition apparatus.

The representative orientation error measuring unit 391 compares the curvature with a predetermined curvature threshold in operation S2103. If the curvature is greater than the curvature threshold, the representative error measuring unit 391 determines that the curvature is small in operation S2105, and if the curvature is less than the curvature threshold, determines that the curvature is large in operation S2107.

If it is determined that the curvature is large, it is possible that an error may exist in the representative orientation. Accordingly, the representative orientation error measuring unit 391 may determine that an error exists in the representative orientation. The case where it is determined that an error exists in the representative orientation will be explained later.

In relation to each first partial region, the representative orientation reestimation unit 395 estimates the representative orientation of each second partial region according to whether the curvature of the region is large or small.

In relation to each second partial region, if it is determined that the curvature of the first partial region to which each second partial region belongs is large, the representative orientation reestimation unit 395 selects only the gradients that satisfy predetermined pass conditions among gradients of pixels of the first partial region, in response to the representative orientation of the first partial region to which each second partial region belongs, and estimates the representative orientation of each second partial region in response to the selected gradient.

Since the second partial region is smaller than the first partial region, the second partial region is more sensitive to noise. Accordingly, in some embodiments of the present invention, in order to estimate the representative orientation of each second partial region, noise is restricted by using the representative orientation of each first partial region and then, the representative orientation of the second partial region is estimated.

Figure 22:
FIG. 22 illustrates a process of restraining noise by estimating a representative orientation for partial regions where orientation errors by a curvature exist, according to some embodiments of the present invention.

FIG. 22 illustrates a process of restraining noise by estimating a representative orientation for partial regions where orientation errors exist as a result of curvature, according to some embodiments of the present invention.

As shown in FIG. 22, in some embodiments of the present invention, a predetermined pass region (FIG. 22 (A)) corresponding to the representative orientation of the first partial region is set, and by using only the gradient of pixels inside the predetermined pass region, the representative orientation of the second partial region is estimated such that noise (FIG. 22 (B) and (C)) can be restricted.

Accordingly, by using the representative orientation ($\theta$) of the first partial region, the representative orientation reestimation unit 395 selects only the gradients satisfying the pass region conditions among the gradients of pixels of the first partial region, and newly defines a gradient to estimate the representative orientation of each second partial region. In some embodiments of the present invention, the pass region conditions are given as the following equations 21 and 22:

$$Gy < \tan(\theta+90)Gx + \beta_{pb} \quad (21)$$

$$Cy > \tan(\theta+90)Gx - \beta_{pb} \quad (22)$$

where (Gx, Gy) denotes the gradient of the first partial region, and $\beta_{pb}$ denotes a constant determined according to the characteristic of a fingerprint acquisition apparatus.

In relation to each second partial region, if it is determined that the curvature of the first partial region to which each second partial region belongs is small, the representative orientation reestimation unit 395 allocates the representative orientation of the first partial region, to each second partial region belonging to the first partial region as the representative orientation. The method of allocating the representative orientation by the representative orientation reestimation unit 39 is based on the linear characteristic of a ridge.

Figure 23:
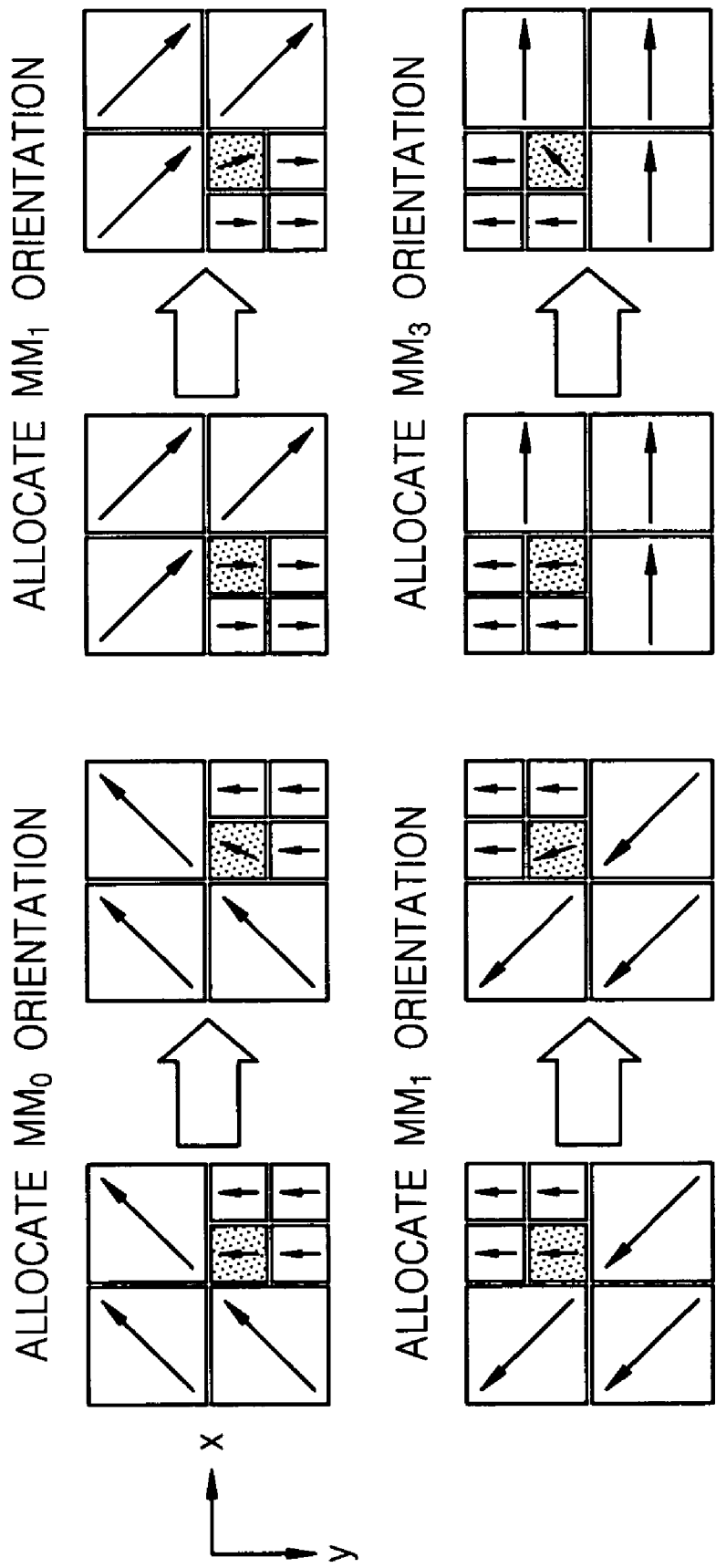
FIG. 23 illustrates a process of allocating an orientation to a second partial region having an orientation identity according to some embodiments of the present invention.

FIG. 23 illustrates a process of allocating an orientation to a second partial region having an orientation identity according to some embodiments of the present invention. The method of allocating a representative orientation by the representative orientation reestimation unit 395 will now be explained in detail with reference to FIG. 23.

As described above, each first partial region is divided into four second partial regions of a same size, and each second partial region is defined as shown in FIG. 23. That is, when the first partial region is divided into four second partial regions, regions MM0, MM1, MM2, and MM3 are defined on the xy-plane, as a region between (0, 0) and (N/2, N/2), a region between (N/2, 0) and (N, N/2), a region between (0, N/2) and (N/2, N), and a region between (N/2, N/2) and (N, N), respectively.

The representative orientation reestimation unit 395 measures the vertical orientation difference with the first partial regions adjacent in the vertical direction to the first partial region to which each second partial region belongs, and the horizontal orientation difference with the first partial regions adjacent in the horizontal direction to the first partial region.

In some embodiments of the present invention, the vertical orientation difference and the horizontal orientation difference are measured by using the following equations 23-1 through 24-4:

$$\Delta\theta_{h_0}[y][x] = |\theta_{NN}[y][x] - \theta_{NN}[y][x-1]| \quad (23\text{-}1)$$

$$\Delta\theta_{h_1}[y][x] = |\theta_{NN}[y][x] - \theta_{NN}[y][x+1]| \quad (23\text{-}2)$$

$$\Delta\theta_{h_2}[y][x] = |\theta_{NN}[y][x] - \theta_{NN}[y][x-1]| \quad (23\text{-}3)$$

$$\Delta\theta_{h_3}[y][x] = |\theta_{NN}[y][x] - \theta_{NN}[y][x+1]| \quad (23\text{-}4)$$

$$\Delta\theta_{v_0}[y][x] = |\theta_{NN}[y][x] - \theta_{NN}[y-1][x]| \quad (24\text{-}1)$$

$$\Delta\theta_{v_1}[y][x] = |\theta_{NN}[y][x] - \theta_{NN}[y-1][x]| \quad (24\text{-}2)$$

$$\Delta\theta_{v_2}[y][x] = |\theta_{NN}[y][x] - \theta_{NN}[y+1][x]| \quad (24\text{-}3)$$

$$\Delta\theta_{v_3}[y][x] = |\theta_{NN}[y][x] - \theta_{NN}[y+1][x]| \quad (24\text{-}4)$$

where $\Delta\theta hi$ and $\Delta\theta vi$ denote the horizontal orientation difference and the vertical orientation difference in region MMi, respectively, $\theta NN[y][x]$ denotes the representative orientation of the first partial region to which region MMi belongs, and $\theta NN[y+1][x]$, $\theta NN[y-1][x]$, $\theta NN[y][x-1]$ and $\theta NN[y][x+1]$ denote the representative orientations of the adjacent first partial region to above, below, to the left and to the right of the first partial region, respectively, to which region MMi belongs to.

If both the horizontal orientation difference and the vertical orientation difference are greater than predetermined vertical orientation threshold and horizontal orientation threshold, the representative orientation reestimation unit 395 allocates the representative orientation of each second partial region by using the following equation 25-4, or else allocates without change, the representative orientation of the first partial region to which each second partial region belongs, to the second partial region as the representative orientation:

$$\theta_{MM_1}[j][i] = \tfrac{1}{4}|2\theta_{NN}[y][x] + \theta_{NN}[y-1][x] + \theta_{NN}[y][x-1]| \quad (25\text{-}1)$$

$$\theta_{MM_2}[j][i] = \tfrac{1}{4}|2\theta_{NN}[y][x] + \theta_{NN}[y-1][x] + \theta_{NN}[y][x+1]| \quad (25\text{-}2)$$

$$\theta_{MM_3}[j][i] = \tfrac{1}{4}|2\theta_{NN}[y][x] + \theta_{NN}[y+1][x] + \theta_{NN}[y][x-1]| \quad (25\text{-}3)$$

$$\theta_{MM_4}[j][i] = \tfrac{1}{4}|2\theta_{NN}[y][x] + \theta_{NN}[y+1][x] + \theta_{NN}[y][x+1]| \quad (25\text{-}4)$$

As described above, even when a region with a large curvature exists in the first partial region, the orientation estimation apparatus 300 according to some embodiments of the present invention estimates the orientation by dividing the first partial region into second partial regions having smaller sizes, such that the fingerprint orientation can be accurately estimated.

Also, as described above, when it is determined that the curvature is large, the representative orientation error measuring unit 391 can determine that an error exists in the estimated representative orientation.

Accordingly, the representative error measuring unit 391 can further determine whether or not an error exists in the representative orientation of each second partial region. If there is no error, the representative orientation error estimation unit 391 outputs the estimated representative orientation as the orientation information of the fingerprint image.

If an error exists, the partial region redivision unit 393 divides each of the second partial regions into sub-partial regions of smaller sizes, and the representative orientation reestimation unit 395 estimates the representative orientation of each of the divided sub-partial regions according to whether or not an error exists.

Also, until no error exists in the estimated representative orientation of each sub-partial region, the representative orientation error measuring unit 391 can further determine whether or not an error exists in the estimated representative orientation of each sub-partial region.

If no error exists in the representative orientation of each sub-partial region, the representative orientation error measuring unit 391 outputs the representative orientation of each sub-partial region as the orientation information of the fingerprint image.

If an error exists in the representative orientation of each sub-partial region, the partial region redivision unit 393 divides each of the sub-partial regions into sub-partial regions of smaller sizes, and the representative orientation reestimation unit 395 estimates the representative orientation of each of the divided sub-partial regions of smaller sizes.

As described above, the orientation reestimation unit 390 determines whether or not an error exists in the representative orientation of each partial region of a predetermined size, and until no error exists in the representative orientation, repeatedly performs the process of dividing each partial region into sub-partial regions of smaller sizes and estimating the representative orientation. By doing so, the orientation information of a fingerprint can be accurately extracted even from a fingerprint image with a serious distortion.

As described above, methods of estimating an orientation according to some embodiments of the present invention may have an advantage that the orientation of the fingerprint can be accurately measured even in the regions in which the curvature of a ridge changes greatly, such as a core point and a delta point.

Also, methods of estimating an orientation according to some embodiments of the present invention may accurately measure the orientation of a fingerprint from a fingerprint image distorted by a variety of external factors.

Furthermore, methods of estimating an orientation according to some embodiments of the present invention may accurately measure the orientation of a fingerprint even in case where a clear fingerprint image cannot be obtained, such as when a fingerprint image is obtained by using a digital camera or a mobile phone camera.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of estimating an image orientation field, comprising:
    dividing an image into first partial regions;
    measuring gradients of pixels of the image;
    estimating representative orientations of the first partial regions;
    filtering the image using a double orientation filter to form an improved image;
    remeasuring the representative orientations of the first partial regions by remeasuring the gradients of the pixels of the improved image;
    dividing the first partial regions into second partial regions;
    estimating representative orientations of the second partial regions with respect to curvature of the first partial regions in response to the remeasured representative orientations of the first partial regions and the remeasured gradients of the pixels; and
    after estimating the representative orientation of the second partial regions, determining whether or not an error exists in the estimated representative orientation of the second partial regions, and if an error exists, dividing the second partial region for which the error exists into sub-partial regions of smaller sizes and then estimating representative orientations of the sub-partial regions.

2. The method of claim 1, wherein estimating the representative orientations of the first partial regions comprises:
    dividing the image into the first partial regions;
    measuring the gradients of pixels of the first partial regions with respect to a first orientation and a second orientation using gradient measuring operators in the first orientation and the second orientation, wherein the gradient measuring operators are perpendicular to each other; and
    measuring the orientations of pixels of the first partial regions using the measured gradients of the pixels and measuring the representative orientations of the first partial regions using a histogram with respect to the measured orientations of pixels of the first partial regions.

3. The method of claim 2, wherein in the gradient measuring operator of the first orientation, a pixel whose gradient is measured is taken as a central pixel, and weights of pixels immediately adjacent to the central pixel are less than weights of pixels second-adjacent to the central pixel in the first orientation, and
    in the gradient measuring operator of the second orientation, a pixel whose gradient is measured is taken as a central pixel, and weights of pixels immediately adjacent to the central pixel are less than weights of pixels second-adjacent to the central pixel in the second orientation.

4. The method of claim 3, wherein the first orientation is the x orientation in a rectangular coordinate system and the second orientation is the y orientation in the rectangular coordinates system,
    the gradient measuring operator (Ox(x,y)) in the first orientation has a size of 5×5 pixels and the coordinates of the central pixel are (2, 1), values in coordinates of the gradient measuring operator in the first orientation are Ox(0, 0)=1, Ox(1, 0)=0, Ox(2, 0)=0, Ox(3, 0)=0, Ox(4, 0)=−1, Ox(0, 1)=2, Ox(1, 1)=1, Ox(2, 1)=0, Ox(3, 1)=−1, Ox(4, 1)=−2, Ox(0, 2)=1, Ox(1, 2)=0, Ox(2, 2)=0, Ox(3, 2)=0, Ox(4, 2)=−1, and
    the gradient measuring operator (Oy(x,y)) in the second orientation has a size of 3×5 pixels and the coordinates of the central pixel are (1, 2), values in coordinates of the gradient measuring operator in the second orientation are Oy(0, 0)=−1, Oy(0, 1)=0, Oy(0, 2)=0, Oy(0, 3)=0, Oy(0, 4)=1, Oy(1, 0)=−2, Oy(1, 1)=−1, Oy(1, 2)=0, Oy(1, 3)=1, Oy(1, 4)=2, Oy(2, 0)=−1, Oy(2, 1)=0, Oy(2, 2)=0, Oy(2, 3)=0, Oy(2, 4)=1.

5. The method of claim 2, wherein measuring the gradients of pixels of the image comprises measuring the gradients of the first orientation and the second orientation by performing convolution operations of gradient measuring operators of the first orientation and the second orientation with pixels neighboring a pixel whose gradient is being measured.

6. The method of claim 5, wherein the gradient in the first orientation is measured using the following equation:

$$xGradient(x, y) = \sum_{i=-2}^{2} \sum_{j=-1}^{1} p(x+i, y+j)O_x(i+2, j+1)$$

and the gradient in the second orientation is measured using the following equation:

$$yGradient(x, y) = \sum_{i=-1}^{1} \sum_{j=-2}^{2} p(x+i, y+j)O_y(i+1, j+2)$$

where xGradient(x, y) and yGradient(x, y) denote the first orientation gradient and the second orientation gradient, respectively, of a pixel at coordinates (x, y), p(x, y) denotes a grayscale value of a pixel at coordinates (x, y), Ox(x, y) and Oy(x, y) denote the first gradient measuring operator and the second gradient measuring operator, respectively with a pixel at coordinates (x, y) as a central pixel, and the first orientation gradient measuring operator and the second orientation gradient measuring operator have sizes of 5×5 pixels and 3×5 pixels, respectively.

7. The method of claim 2, wherein the orientation of pixels is measured in response to a ratio of the first orientation gradient and the second orientation gradient.

8. The method of claim 7, wherein the orientation of pixels is measured using the following equation:

$$O(x, y) = \frac{180}{\pi} \tan^{-1}\left(\frac{yGradient(x, y)}{xGradient(x, y)}\right)$$

where O(x, y) denotes the orientation of a pixel at coordinates (x, y), and Gx(x, y) and Gy(x, y) denote the first and second orientation gradients, respectively, of a pixel at coordinates (x, y).

9. The method of claim 8, wherein the histogram is obtained by quantizing the orientations in predetermined angular units.

10. The method of claim 9, wherein the histogram is expressed as the following equation:

$$H_{MA}(O(x, y)/Z) = \sum_{i=-M}^{M} \sum_{l=M}^{M} K(O(mN+i, nN+j)/Z$$

where Hmn denotes the histogram of a first partial region at a location which is an m-th partial region in the x orientation and an n-th partial region in the y orientation, and K(1)=1, and 1 is a value obtained by quantizing the orientation of pixel.

11. The method of claim 2, wherein an orientation corresponding to a location in which the histogram has a maximum value is taken as the representative orientation of a first partial region.

12. The method of claim 2, wherein measuring the representative orientation of first partial regions further comprises adjusting a brightness uniformity of the image by processing a brightness characteristic of the first partial regions, using a brightness characteristic of the image.

13. The method of claim 12, wherein the adjusting the image comprises:
  measuring an image uniformity degree in response to an absolute value of a brightness difference among pixels in a first partial region;
  determining that the fingerprint pattern of the region is uniform if the fingerprint pattern uniformity degree is less than a predetermined uniformity degree threshold, or else determining that the fingerprint pattern of the region is not uniform; and
  making the fingerprint pattern uniform by low-pass filtering the region determined to be non-uniform.

14. The method of claim 13, wherein the fingerprint pattern uniformity degree is measured using the following equation:

$$V_{noise}(m, n) = \sum_{i=0}^{N} \sum_{j=0}^{N} |x_{(mN+i,nN+j)} - x_{(mN+i-1,nN+j)}|$$

where Vnoise(m, n) denotes the fingerprint pattern uniformity degree of a first partial region at a location which is an m-th region in the x orientation and an n-th region in the y orientation, and x(x, y) denotes the brightness of a pixel at coordinates (x, y).

15. The method of claim 13, wherein the low-pass filtering is performed using a Gaussian filter.

16. The method of claim 1, wherein the image comprises a fingerprint image, and wherein remeasuring the representative orientation comprises:

determining whether the image of a first partial region is clear or not by measuring coefficients indicating whether a fingerprint ridge and a fingerprint valley are clearly distinguished or not;
  filtering images of the first partial regions using a double orientation filter in response to whether the image is determined to be clear or not; and
  remeasuring the representative orientations of the first partial regions by remeasuring the gradient of pixels of the filtered image.

17. The method of claim 16, wherein determining whether the image is clear or not comprises:
  measuring a distinction coefficient indicating the degree that the ridges and valleys of the image are clearly distinguished, and a single orientation coefficient indicating the degree that the structure of the ridge and valley of the image form a single orientation; and
  if the distinction coefficient is greater than a predetermined distinction threshold and the single orientation coefficient is greater than a predetermined single orientation threshold, determining that the image is clear, and if the distinction coefficient is not greater than the predetermined distinction threshold or the single orientation coefficient is not greater than the predetermined single orientation threshold, determining that the image is not clear.

18. The method of claim 17, wherein the distinction coefficient is measured using the following equation:

$$C_{h1} = \frac{\sum_{x=0}^{N}\sum_{y=0}^{N} xGradient[y][x] \cdot xGradient[y][x] + \sum_{x=0}^{N}\sum_{y=0}^{N} yGradient[y][x] \cdot yGradient[y][x]}{N \cdot N}$$

and the single orientation coefficient is measured using the following equation:

$$C_{h2} = \frac{\sum_{y=0}^{N}\sum_{x=0}^{N} \{xGradient[y][x] \cdot \cos\theta + yGradient[y][x] \cdot \sin\theta - \overline{m}_y\}^2}{\sum_{y=0}^{N}\sum_{x=0}^{N} \{yGradient[y][x] \cdot \cos\theta - xGradient[y][x] \cdot \sin\theta - \overline{m}_x\}^2}$$

$$\overline{m}_y = \frac{\sum_{x=0}^{N}\sum_{y=0}^{N} xGradient[y][x] \cdot \cos\theta + yGradient[y][x] \cdot \sin\theta}{N \cdot N}$$

$$\overline{m}_x = \frac{\sum_{x=0}^{N}\sum_{y=0}^{N} xGradient[y][x] \cdot \cos\theta - xGradient[y][x] \cdot \sin\theta}{N \cdot N}$$

where Ch1 denotes the distinction coefficient Ch2 denotes single orientation coefficient, and the distinction coefficient indicates wheather or not the gradients of the first and second orientation have a concentrated distribution and the single oriention coefficient indicates whether the gradients of the first and second orientations are distributed in a circular shape and/or in an elliptical shape.

19. The method of claim 16, wherein the improved image is obtained by removing noise existing in a ridge and a valley in the first partial regions, by using a first orientation filter emphasizing the boundary of a ridge and a valley in relation to four predetermined orientations, and a second orientation filter removing noise existing inside the ridge and valley in relation to the four orientations, and wherein the double orientation filter includes the first and second orientation filters.

20. The method of claim 19, wherein in the first orientation filter, a pixel in which a boundary of a ridge and a valley is desired to be emphasized is taken as a central pixel, and in relation to each of the four predetermined orientations, pixels immediately adjacent to the central pixel have the same weight as the weight of the central pixel, and pixels second-adjacent to the central pixel have weights whose sign is opposite to the sign of the weight of the central pixel and whose absolute value is less than the absolute value of the weight of the central pixel, and pixels third-adjacent to the central pixel have weights whose sign is opposite to the sign of the central pixel and whose absolute value is the same as the absolute value of the weight of the central pixel.

21. The method of claim 20, wherein in the first orientation filter, the weight of the central pixel and the weight of pixels immediately adjacent to the central pixel are 2 each, the weight of pixels second-adjacent to the central pixel is −1, and the weight of pixels third-adjacent to the central pixel is −2.

22. The method of claim 19, wherein in the second orientation filter, a pixel in which noise inside a ridge and a valley is desired to be removed is taken as a central pixel, and the central pixel has a maximum weight, and pixels immediately adjacent to the central pixel and pixels second-adjacent to the central pixel have weights less than the weight of the central pixel, and pixels third-adjacent to the central pixel have weights less than the weight of pixels second-adjacent to the central pixel.

23. The method of claim 22, wherein in the first orientation filter, the weight in the central pixel is 3, the weight of pixels immediately adjacent to the central pixel and the weight of pixels second-adjacent to the central pixel are 2, and the weight of pixels third-adjacent to the central pixel is 1.

24. The method of claim 19, wherein obtaining the improved image comprises:

filtering the first partial regions that are determined to be clear with a first orientation filter and a second orientation filter for an orientation corresponding to the representative orientation of the first partial region; and measuring clearness in four orientations of first partial regions that are determined to be unclear using the first orientation filter and the second orientation filter for each of the four orientations, filtering the first partial regions that are determined to be unclear with the first orientation filter and the second orientation filter in an orientation in which the clearness is a maximum, measuring the clearness in each orientation of the first partial region in response to the power of each orientation of the first partial region after filtering using the first orientation filter, and measuring the single orientation coefficient of each orientation of the first partial region after filtering using the second orientation filter.

25. The method of claim 24, wherein clearness is measured using the following equation:

$$C_{reactivity} = \alpha \cdot C_{RS_i} + \beta \cdot C_{RNB_i}$$

$$C_{RS_i} = 100 \cdot \frac{\sum_{x=0}^{N}\sum_{y=0}^{N}\{Inimage[y][x] \otimes RSF_i\}}{MaxPower_o}$$

$$C_{RNR_i} = \frac{N\sum_{y=0}^{N}\sum_{x=0}^{N}\{xGradient[y][x] \cdot \cos\theta + yGradient[y][x] \cdot \sin\theta - \overline{m_y}\}^2}{\sum_{y=0}^{N}\sum_{x=0}^{N}\{yGradient[y][x] \cdot \cos\theta - xGradient[y][x] \cdot \sin\theta - \overline{m_x}\}^2}$$

where Creactivity i denotes the clearness in i-th orientation in each first partial region, CRSi denotes the power in i-th orientation in each first partial region after filtering using the first orientation filter, CRNRi denotes the single orientation coefficient in i-th orientation of each first partial region after filtering using the second orientation filter, and $\alpha$ and $\beta$ denote predetermined constants corresponding to conditions under which the image is taken.

26. The method of claim 1, further comprising, after remeasuring the representative orientation, measuring the entire orientation of adjacent first partial regions and correcting an error of the remeasured representative orientation of the first partial regions in response to a difference of the entire orientation and the remeasured representative orientations of the first partial regions.

27. The method of claim 26, wherein correcting the error of the first partial regions comprises:

measuring the entire orientation of adjacent first partial regions in response to the mean value of a difference of the remeasured representative orientation and a predetermined angle;

determining whether or not an error occurs in response to the difference of the measured entire orientation and the remeasured representative orientation of the first partial regions; and for first partial regions in which an error occurs, if there is a vertical orientation identity or a horizontal orientation identity with the adjacent first partial regions above, below, to the left or to the right of the first partial region, correcting the error in response to the mean value of the adjacent first partial regions in the horizontal direction, and if there is no vertical orientation identity or horizontal orientation identity with the adjacent first partial regions above, below, to the left or to the right of the first partial region, correcting the error using an asymmetrical characteristic of adjacent first partial regions in the horizontal direction.

28. The method of claim 27, wherein the predetermined angle is 90 degrees.

29. The method of claim 1, wherein estimating the representative orientations of the second partial regions comprises:

measuring curvatures of the first partial regions by measuring a vertical orientation difference with the representative orientation of adjacent first partial regions in the vertical direction, and a horizontal orientation difference with the representative orientation of adjacent first partial regions in the horizontal direction; and estimating representative orientations of the second partial regions according to whether the first partial region has a large curvature or a small curvature.

30. The method of claim 29, wherein the vertical orientation difference is measured using the following equation:

$$\Delta v_\theta = ||\theta_{[y-1][x]} - \theta_{[y+1][x]}| - 90|$$

and the horizontal orientation difference is measured using the following equation:

$$\Delta h_\theta = ||\theta_{[y][x-1]} - \theta_{[y][x+1]}| - 90|$$

and the curvature is measured using the following equation:

$$\Delta C v_\theta = \alpha \Delta v_\theta + \beta \Delta h_\theta$$

where $\Delta v\theta$ and $\Delta h\theta$ denote the vertical orientation difference and the horizontal orientation difference, respectively, $\Delta Cv\theta$ denotes the curvature, and $\alpha$ and $\beta$ denote proportionality constants determined according to characteristics of an image acquisition apparatus.

31. The method of claim 30, wherein it is determined that the curvature is small if the curvature is smaller than a predetermined curvature threshold, and it is determined that the curvature is large if the curvature is larger than the predetermined curvature threshold.

32. The method of claim 29, wherein estimating the representative orientation of the second partial regions comprises:
   if the curvature of the first region to which the second partial regions belongs is determined to be small, allocating the representative orientations of the first partial regions as the representative orientations of the second partial regions; and
   if the curvature of a first region to which a second partial regions belongs is determined to be large, selecting only gradients satisfying a predetermined pass condition among the gradients of pixels of the first partial region, and estimating the representative orientation of the second partial regions in response to the selected gradient.

33. The method of claim 32, wherein, in allocating the representative orientation of the first partial region as the representative orientation of the second partial regions, the representative orientation of the second partial regions is allocated in response to a vertical orientation difference with adjacent first partial regions in the vertical direction and a horizontal orientation difference with adjacent first partial regions in the horizontal direction.

34. The method of claim 1, further comprising:
   dividing the sub-partial regions into sub-partial regions of smaller sizes until no error exists in the estimated representative orientation of the sub-partial regions.

35. The method of claim 1, wherein in determining whether or not an error exists, the curvature of the second partial regions is measured, and if the curvature is smaller than a predetermined curvature threshold, it is determined that an error exists.

36. An apparatus for estimating an orientation comprising:
   a partial region division unit configured to divide an image into first partial regions;
   an orientation estimation unit configured to estimate a representative orientation of the first partial regions by measuring gradients of pixels of the image, configured to filter the image using a double orientation filter according to the estimated representative orientation, and configured to reestimate the representative orientation of the first partial regions by remeasuring the gradients of pixels of the improved image; and
   an orientation reestimation unit configured to divide the first partial regions into second partial regions, and configured to estimate the representative orientations of the second partial regions with respect to curvatures of the first partial regions in response to the remeasured representative orientations of the first partial regions and the remeasured gradients of the pixels;
   wherein the orientation reestimation unit comprises:
   a partial region redivision unit configured to divid the first partial regions into second partial regions;
   a representative orientation error measuring unit configured to measure a curvature of the first partial regions by measuring the vertical orientation difference with the representative orientation of the adjacent first partial regions in the vertical direction, and the horizontal orientation difference with the representative orientation of the adjacent first partial regions in the horizontal direction, and in response to the measured curvature, configured to measure the error of the representative orientation by determining whether the first partial region is a region of a large curvature or of a small curvature; and
   a representative orientation reestimation unit configured to estimate representative orientations of the second partial regions according to whether the first partial region has a large curvature or a small curvature.

37. The apparatus of claim 36, further comprising a uniformization unit configured to adjust a brightness of the image uniformly by processing brightness characteristics of the first partial regions, using a brightness characteristic of the image.

38. The apparatus of claim 37, wherein the image comprises a fingerprint pattern image, and wherein the uniformization unit comprises:
   a fingerprint pattern uniformity degree determination unit configured to determine if a fingerprint pattern of the region is uniform, or else determining that the fingerprint pattern of the region is not uniform if a fingerprint pattern uniformity degree measured in response to an absolute value of a brightness difference among pixels in a first partial region is less than a predetermined uniformity degree threshold; and
   a fingerprint pattern uniformization unit configured to low-pass filter a region determined to be not uniform.

39. The apparatus of claim 36, wherein the orientation estimation unit comprises:
   a gradient measuring unit configured to perform convolution operations of predetermined neighboring pixels of a pixel whose gradient is being measured with gradient measuring operators of a first orientation and a second orientation in order to measure the first and second gradients; and
   a representative orientation estimating unit configured to measure the orientation of pixels using the measured gradient of the pixels, and to estimate the representative orientations of the first partial regions using a histogram of the measured orientation for each pixel.

40. The apparatus of claim 39, wherein the representative orientation estimation unit comprises:
   an orientation information measuring unit configured to measure the orientation of each pixel in response to a ratio of the first orientation gradient and the second orientation gradient;
   a quantization unit configured to quantize pixels in predetermined angular units; and
   a representative orientation determination unit configured to obtain the histogram of the quantized orientation and to determine an orientation corresponding to a location in which the histogram has a maximum value, as the representative orientation.

41. The apparatus of claim 39, wherein the orientation estimation unit further comprises:

a fingerprint structure improvement unit configured to determine whether or not the image is clear in the first partial regions and to filter images of the first partial regions using a double orientation filter according to whether or not the image is clear;

wherein the gradient measuring unit is further configured to remeasure the gradients of pixels of the improved image, and the representative orientation estimation unit is further configured to reestimate representative orientations of the first partial regions using the remeasured gradients.

42. The apparatus of claim 41, wherein the fingerprint structure improvement unit comprises:

a fingerprint structure clearness determination unit configured to measure a distinction coefficient and a single orientation coefficient in the first partial regions and configured to determine whether or not the image in the first partial regions is clear, by comparing the distinction coefficient and the single orientation coefficient with a predetermined distinction threshold and a single orientation threshold, respectively;

a first orientation filter configured to emphasize a boundary of ridges and valleys in the first partial regions in relation to four predetermined orientations;

a second orientation filter configured to reduce noise existing inside the ridges and valleys in relation to the four orientations; and a image improvement unit configured to improve the image quality of a first partial region that is determined to be clear by filtering the first partial region that is determined to be clear with a first orientation filter and a second orientation filter for an orientation corresponding to the representative orientation of the first partial region, and that is configured to improve the image quality of a first partial region that is determined to be unclear by measuring clearness in the four orientations using the first orientation filter and the second orientation filter for each of the four orientations, and by filtering the first partial region that is determined to be unclear with the first orientation filter and the second orientation filter in an orientation in which the clearness is increased.

43. The apparatus of claim 36, further comprising a post-processing unit configured to measure an entire orientation of adjacent first partial regions and configured to correct an error of the remeasured representative orientations of the first partial regions in response to a difference of the entire orientations and the remeasured representative orientations of the first partial regions.

44. The apparatus of claim 43, wherein the post-processing unit comprises:

an adjacent region orientation evaluation unit configured to measure the entire orientations of the adjacent first partial regions in response to a mean value of a difference of the remeasured representative orientation and a predetermined angle;

an orientation difference measuring unit configured to measure a difference between the measured entire orientations and the remeasured representative orientations of the first partial regions;

an orientation error determination unit configured to determine whether or not an error occurs by comparing the difference between the measured entire orientation and the remeasured representative orientation of the first partial region, with a predetermined orientation difference threshold; and an orientation error correction unit configured to correct the error in response to the mean value of adjacent first partial regions in the horizontal direction in relation to each first partial region in which an error occurs if there is a vertical orientation identity or a horizontal orientation identity with the adjacent first partial regions above, below, to the left or to the right of the first partial region, and if there is no vertical orientation identity or horizontal orientation identity with the adjacent first partial regions above, below, to the left or to the right of the first partial region in which an error occurs, configured to correct the error using an asymmetrical characteristic of the adjacent first partial regions in the horizontal direction.

45. The apparatus of claim 36, wherein the representative orientation error estimation unit is further configured to determine whether or not an error exists in the estimated representative orientation of the second partial regions, and the representative orientation error estimation unit is configured to output the estimated representative orientation as fingerprint information of the image if no error exists, and the partial region redivision unit is configured to divide the second partial region into sub-partial regions of smaller sizes if an error exists, and the representative orientation reestimation unit is configured to estimate the representative orientation of the divided sub-partial regions according to whether or not an error exists.

46. The apparatus of claim 45, wherein the representative orientation error measuring unit is further configured to determine whether or not an error exists in the estimated representative orientation of each sub-partial region until no error exists in the estimated representative orientation of each sub-partial region, and if no error exists in the representative orientation of each sub-partial region, the representative orientation error measuring unit is configured to output the representative orientation of each sub-partial region as the orientation information of the image, and if an error exists in the representative orientation of the sub-partial regions, the partial region redivision unit is configured to divide the sub-partial regions into sub-partial regions of smaller sizes, and the representative orientation reestimation unit is configured to estimate the representative orientation of the divided sub-partial regions of smaller sizes.

* * * * *